United States Patent [19]
Ettinger et al.

[11] Patent Number: 6,079,693
[45] Date of Patent: Jun. 27, 2000

[54] ISOLATION VALVES

[75] Inventors: Gary C. Ettinger, Los Altos; John M. White, Hayward, both of Calif.

[73] Assignee: Applied Komatsu Technology, Inc., Tokyo, Japan

[21] Appl. No.: 09/082,376

[22] Filed: May 20, 1998

[51] Int. Cl.[7] .................................................... F16K 3/10
[52] U.S. Cl. ........................................ 251/195; 251/175
[58] Field of Search .................................. 251/158, 175, 251/193, 195

[56] References Cited

U.S. PATENT DOCUMENTS

| | | | |
|---|---|---|---|
| 3,040,773 | 6/1962 | McInerney | 251/195 X |
| 3,524,467 | 8/1970 | Worley | 251/175 X |
| 3,717,322 | 2/1973 | Bernard | 251/175 X |
| 3,785,612 | 1/1974 | Schertler . | |
| 4,052,036 | 10/1977 | Schertler . | |
| 4,075,787 | 2/1978 | Krahe | 49/209 |
| 4,157,169 | 6/1979 | Norman | 251/195 |
| 4,343,455 | 8/1982 | Winkler | 251/195 X |
| 4,381,100 | 4/1983 | Schoenberg | 251/195 X |
| 4,562,992 | 1/1986 | Sugisaki et al. . | |
| 4,721,282 | 1/1988 | Shawver et al. | 251/62 |
| 5,087,017 | 2/1992 | Sawa et al. | 251/195 X |
| 5,110,249 | 5/1992 | Norman | 414/217 |
| 5,120,019 | 6/1992 | Davis, Jr. . | |
| 5,379,983 | 1/1995 | Geiser . | |
| 5,577,707 | 11/1996 | Brida . | |
| 5,626,324 | 5/1997 | Nakamura et al. | 251/58 |
| 5,695,564 | 12/1997 | Imahashi | 118/719 |

FOREIGN PATENT DOCUMENTS

| | | |
|---|---|---|
| 0 441 646 A1 | 8/1991 | European Pat. Off. . |
| 0 684 4155 A1 | 11/1995 | European Pat. Off. . |
| 2 363 746 | 3/1978 | France . |
| 44 14 176 A 1 | 10/1995 | Germany . |
| 851 444 | 10/1960 | United Kingdom . |
| 2 240 157 | 7/1991 | United Kingdom . |

*Primary Examiner*—John Fox
*Attorney, Agent, or Firm*—Thomason, Moser and Patterson

[57] ABSTRACT

Isolation valves for selectively sealing a first region from a second region. A gate valve can include a housing which defines a channel between the first and second regions. The valve includes a gate, located in the housing, and displaceable between a stowed position and a deployed position. When the gate is in the stowed position, communication is permitted between the first and second regions. When the gate is in the deployed position, the gate spans the channel and can be controlled to isolate the first and second regions. The valves can be used, for example, in connection with systems for processing large glass substrates. The valves are particularly useful for isolating long rectangular openings, such as the openings in substrate processing chambers. Isolating processing chambers or load lock chambers from one another, for example, in a linear system, is facilitated.

17 Claims, 18 Drawing Sheets

ISOLATION VALVES

RELATED APPLICATIONS

The present application is related to co-pending U.S. patent application Ser. No. 08/946,922, filed Oct. 8, 1997 and entitled "Modular On-Line Processing System," as well as the following U.S. patent applications which are being filed concurrently with this application: (1) "Method and Apparatus for Substrate Transfer and Processing" [attorney docket 2519/US/AKT (05542/235001)]; (2) "Multi-Function Chamber For A Substrate Processing System," [attorney docket 2712/US/AKT (05542/268001)]; (3) "An Automated Substrate Processing System," [attorney docket 2429/US/AKT (05542/245001)]; (4) "Substrate Transfer Shuttle Having a Magnetic Drive," [attorney docket 2638/US/AKT (05542/264001)]; (5) "Substrate Transfer Shuttle," [attorney docket 2688/US/AKT (05542/265001)]; (6) "In-Situ Substrate Transfer Shuttle," [attorney docket 2703/US/AKT (05542/266001)]; and (7) "Modlar Substrate Processing System", [attorney docket 2311/US/AKT (05542/233001)].

The foregoing patent applications, which are assigned to the assignee of the present application, are incorporated herein by reference in their entirety.

BACKGROUND

The present invention relates generally to substrate processing systems, and, in particular, to isolation valves for substrate processing systems.

Glass substrates are being used for applications such as active matrix television and computer displays, among others. Each glass substrate can form multiple display monitors each of which contains more than a million thin film transistors.

The processing of large glass substrates often involves the performance of multiple sequential steps, including, for example, the performance of chemical vapor deposition (CVD) processes, physical vapor deposition (PVD) processes, or etch processes. Systems for processing glass substrates can include one or more process chambers for performing those processes.

The glass substrates can have dimensions, for example, of 550 mm by 650 mm. The trend is toward even larger substrate sizes, such as 650 mm by 830 mm and larger, to allow more displays to be formed on the substrate or to allow larger displays to be produced. The larger sizes place even greater demands on the capabilities of the processing systems.

Some of the basic processing techniques for depositing thin films on the large glass substrates are generally similar to those used, for example, in the processing of semiconductor wafers. Despite some of the similarities, however, a number of difficulties have been encountered in the processing of large glass substrates that cannot be overcome in a practical way and cost effectively by using techniques currently employed for semiconductor wafers and smaller glass substrates.

For example, effcient production line processing requires rapid movement of the glass substrates from one work station to another, and between vacuum environments and atmospheric environments. The large size and shape of the glass substrates makes it difficult to transfer them from one position in the processing system to another. As a result, cluster tools suitable for vacuum processing of semiconductor wafers and smaller glass substrates, such as substrates up to 550 mm by 650 mm, are not well suited for the similar processing of larger glass substrates, such as 650 mm by 830 mm and above. Moreover, cluster tools require a relatively large floor space.

Similarly, chamber configurations designed for the processing of relatively small semiconductor wafers are not particularly suited for the processing of these larger glass substrates. The chambers must include apertures of sufficient size to permit the large substrates to enter or exit the chamber. Moreover, processing substrates in the process chambers typically must be performed in a vacuum or under low pressure. Movement of glass substrates between processing chambers, thus, requires the use of valve mechanisms which are capable of closing the especially wide apertures to provide vacuum-tight seals and which also must minimize contamination.

Furthermore, relatively few defects can cause an entire monitor formed on the substrate to be rejected. Therefore, reducing the occurrence of defects in the glass substrate when it is transferred from one position to another is critical. Similarly, misalignment of the substrate as it is transferred and positioned within the processing system can cause the process uniformity to be compromised to the extent that one edge of the glass substrate is electrically non-functional once the glass has been formed into a display. If the misalignment is severe enough, it even may cause the substrate to strike structures and break inside the vacuum chamber.

Other problems associated with the processing of large glass substrates arise due to their unique thermal properties. For example, the relatively low thermal conductivity of glass makes it more difficult to heat or cool the substrate uniformly. In particular, thermal losses near the edges of any large-area, thin substrate tend to be greater than near the center of the substrate, resulting in a non-uniform temperature gradient across the substrate. The thermal properties of the glass substrate combined with its size, therefore, makes it more dificult to obtain uniform characteristics for the electronic components formed on different portions of the surface of a processed substrate. Moreover, heating or cooling the substrates quickly and uniformly is more ditcult as a consequence of its poor thermal conductivity, thereby reducing the ability of the system to achieve a high throughput.

In the past, a variety of isolation valves have been used to isolate two regions from one another. In an exemplary construction, a gate slides into and out of a path, transversely to the path, to open and close the valve. With the gate in a closed position, a seal can be formed between the gate and a valve seat to prevent flow through the valve. Slide valves offer particular compactness, in other words, a small size as measured in a direction along the flow path.

One recently proposed system for processing large glass substrates is a modular in-line processing system, such as the system described in the previously mentioned U.S. patent application Ser. No. 08/946,922. Such a system can be used for CVD or other thermal substrate processing and can include multiple back-to-back processing chambers through which a substrate is transferred. The process chambers typically are operated under vacuum or under very low pressure. Thus, there is a relatively uniform pressure distribution between the chambers which is insuicient by itself to provide the required tight seal between the gate and the valve seat.

SUMMARY

In general, the invention discloses various improved isolation valves. According to one aspect, an isolation valve for selectively sealing a first region from a second region includes a housing. The housing defines a channel between the first region and the second region, and the channel extends at least between a first port and a second port. The valve also includes a gate disposed within the housing. The gate is displaceable between a stowed position in which communication is permitted between the first region and the second region, and a deployed position in which the gate spans the channel.

The gate includes first and second sealing members, each of which has a respective outward-facing surface. Further, the gate has an expandable member disposed between the first sealing member and the second sealing member, wherein the expandable member is expandable from a first condition to a second condition and can be contracted from the second condition to the first condition.

In the first condition, the gate is moveable between the stowed and deployed positions. In the second condition, with the gate in the deployed position, the first and second sealing members are biased apart from each other by expansion of the expandable member so that the outward-facing surface of the first sealing member is sealingly engaged to the first port so as to seal the first region from the second region. The outward-facing surface of the second sealing member is engaged to the housing.

In some implementations, such as where two or more processing chambers are positioned back-to-back, both sealing members engage their respective ports to seal the first region from the second region.

In various implementations, the expandable member can include a bellows or an inflatable member, such as an elastomeric bladder.

In another aspect, an isolation valve includes a housing defining a channel between a first chamber and a second chamber and a gate assembly disposed within the housing. The valve also includes means for positioning the gate assembly between a first port in communication with the first chamber and a second port in communication with the second chamber. Additionally, the valve has means for causing the gate assembly to engage the first port so as initially to seal the first chamber from the second chamber. Furthermore, the valve has means for altering a pressure within the housing to further seal the first chamber from the second chamber. A method of sealing a first chamber from a second chamber also is disclosed.

In an alternative embodiment, an isolation valve includes a housing having a passageway through which a substrate can be transferred. A surface along a perimeter of the passageway forms a seat for engaging a gate. The valve also includes a gate disposed within the housing, wherein the gate has a first position in which the passageway is open and a second position in which the gate engages the seat to seal the passageway. The valve also has a lift mechanism coupled to the gate for controlling movement of the gate between its first position and an intermediate position opposite the passageway. The valve also includes a rotating mechanism coupled to the gate for controlling movement of the gate between its intermediate position and its second position.

When the gate is in its second position, a horizontal force component can be provided to seal the gate against the passageway. In one implementation, the rotating mechanism includes one or more push cylinders each having respective first and second positions. Movement of the push cylinders between their first and second positions causes the gate to rotate between its intermediate raised position and its second position in which the passageway is sealed.

In various implementations, two or more substrate processing chambers can be positioned back-to-back. A double-sealing isolation valve or independently controllable isolation valves can be provided between the chambers to seal them, for example, during processing.

The valve housings can be formed separately from the chambers and subsequently secured in place. Alternatively, the valve housings can be formed as a single integral unit with a chamber.

Among the advantages of a valve according to the present invention is design flexibility. For example, in the laboratory or industrial setting, the valve can be used as a door or gate through which glass substrates or other items may pass. In such situations, it is advantageous to select a valve geometry (size, cross-sectional profile, etc.) to accommodate the items passing through the valve as well as any other environmental factors. This is preferable to having to conform the items or processes by which they are manipulated to geometries and sizes of available valves.

By way of example, in the manufacture and processing of flat objects such as glass substrates for flat panel displays, processing chambers may be used which have a relatively low profile, in other words, a small height and large width. Space efficiency considerations indicate that the valves sealing such chambers need only have a similarly low profile to accommodate the ingress and egress of the items.

The use of an inflatable member to separate the valve plates can provide a more even distribution of the sealing force between the valve plates than in a purely mechanical system. Thus, in the case of an elongated gate, the sealing force can be distributed substantially continuously along the gate. However, whatever the desired gate profile, an appropriate inflatable chamber can be configured easily and can use stock inflation equipment. This feature provides cost savings by reducing the need for multiple complex mechanical linkages specifically configured for each gate profile.

Another advantage is the ability to accommodate the valve to less than perfect valve seats. The inflatable member has significant flexibility and, therefore, can create an adequate seal despite a loss of parallelism, changes in seat separation, or even loss of flatness. With a mechanically-actuated valve, wear or contamination of the seating surfaces may greatly alter the forces applied to the plates. With the inflation member, the force is simply related to the pressure applied to the chamber. Performance is less sensitive to wear except in the extreme case of a rupture or leak.

Additionally, to compensate for the lack of ability of the camming mechanism to accommodate changes or irregularities in the seats and to accommodate for the effect of wear of the camming mechanism, a highly compressible flexible seal may be utilized with a cam-type valve. Such a seal will necessarily undergo a relatively high deformation and therefore may be subject to wear or failure. With the present invention, the chamber can provide a significant degree of compliance so that the same compliance need not be present in the seals. Therefore, the seals are subjected to less deformation. The wearing of the mechanical linkages also can create contaminant particles which can interfere with the operation of the valve or the operation of any enclosure the valve is used to seal and contaminate any fluid passing through the valve.

In alternative implementations, mechanical isolation valves are disclosed that are particularly suited for modular systems in which multiple chambers are aligned adjacent one another. Each chamber can be provided with passageways at opposite sides of the chamber. The passageways, which can be used for transferring a substrate into or out of the chamber, can be opened or sealed by respective gates which are controlled independently of one another, thereby providing additional flexibility. The mechanical isolation valves are compact and have a relatively simple construction, thereby helping to reduce manufacturing costs.

The mechanical valves also can provide an improved means for sealing one chamber from another chamber and help prevent cross-contamination from process gases used in the various chambers. The mechanical rotation of the gate toward the passageway creates the seal and provides lateral pressure to improve the seal that is required when processing glass substrates.

When two chambers are aligned adjacent one another, the area between the chambers can be isolated from either one or both of the chamber interiors effectively forming a buffer chamber. The area between the chambers can, therefore, be protected, for example, from process gases, some of which may be corrosive. By isolating the area between the chambers from the chamber interiors, other components of the system external to the processing chambers can be protected from contact with corrosive gases or other harmful materials used within the chambers during substrate processing. Additionally, the pressure of the area between the chambers can be controlled independently of the pressures in either one or both of the chamber interiors.

Other features and advantages will be apparent from the detailed description, drawings and claims.

DETAILED DESCRIPTION

Figure 1:
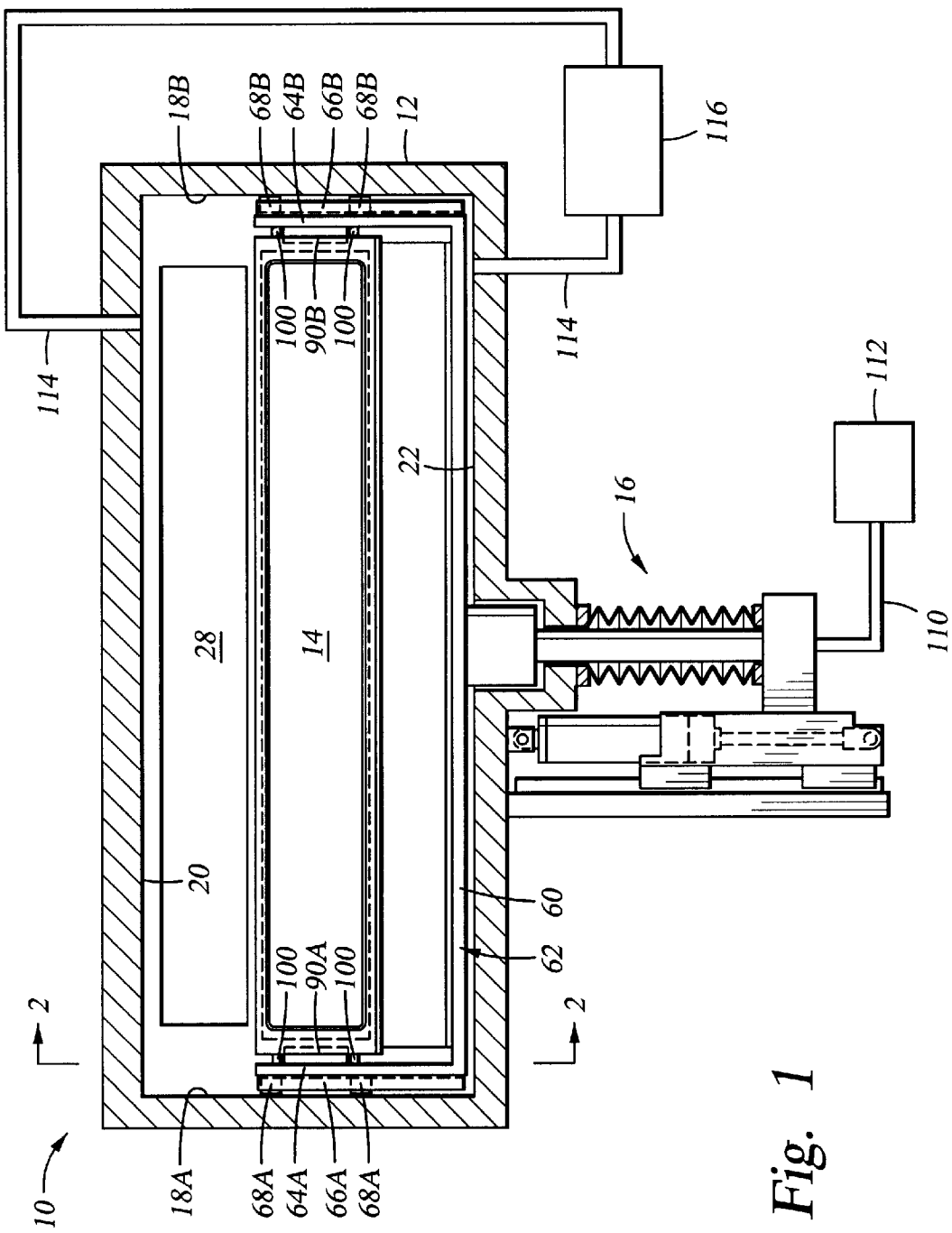
FIG. 1 is a transverse cross-sectional view of a valve, shown in an open configuration, according to one implementation of the invention.
Figure 2:
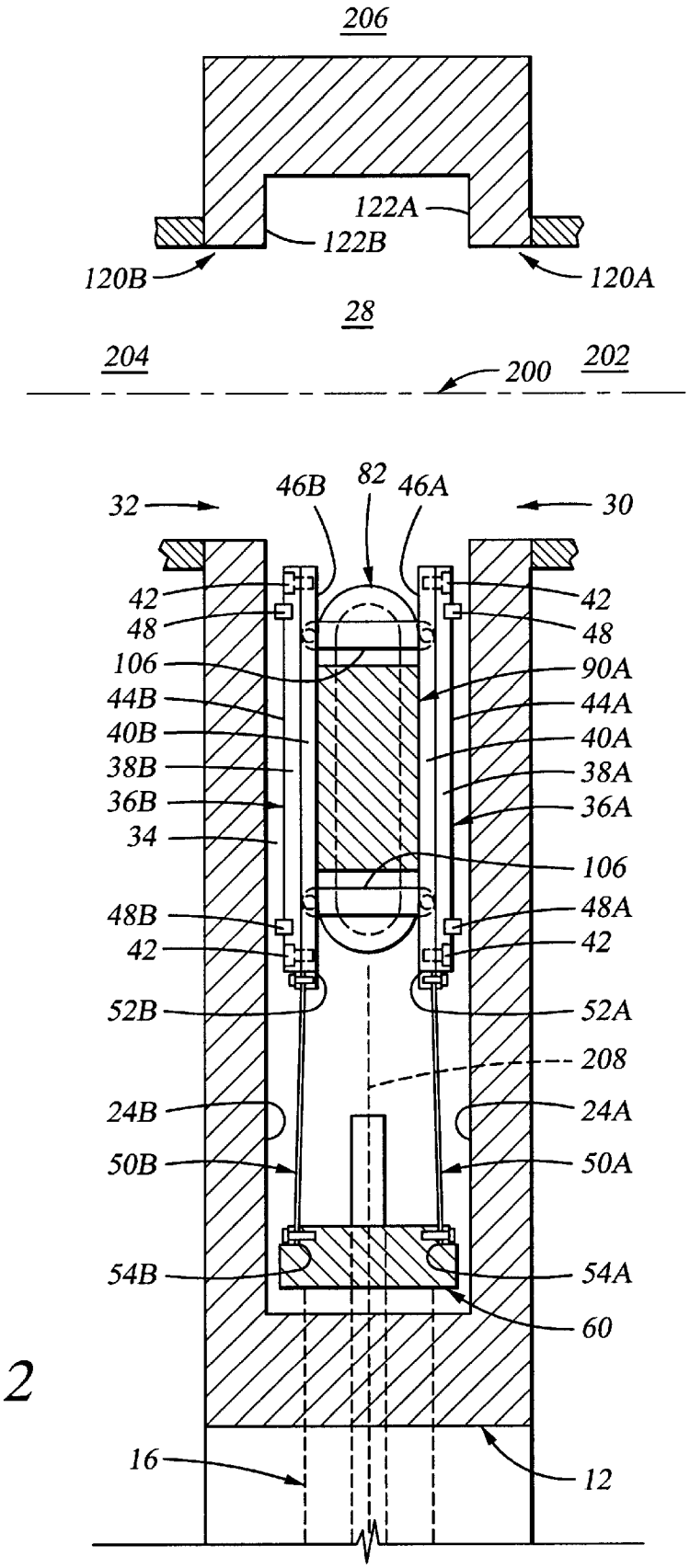
FIG. 2 is a partial longitudinal cross-sectional view of the valve of FIG. 1, taken along line 2—2.

As shown in FIGS. 1 and 2, a valve 10 includes a housing 12, a gate 14 and an actuator 16. The housing 12 has an interior bounded by first and second vertically-extending sides 18A and 18B, a top 20, a bottom 22, and ends 24A, 24B. In general, the valve can be used, for example, to isolate one process chamber from another process chamber, or to isolate different regions from one another.

The housing defines a passageway 28 which extends along a path through the housing from an inlet 30 to an outlet 32. In various implementations, the roles of the inlet 30 and outlet 32 can be reversed such that a substrate can travel in either direction through the valve. The channel has a longitudinal axis 200. The inlet 30 and outlet 32 extend transverse to the axis 200 and are elongate and generally rectangular in shape. First and second regions or chambers 202, 204 are located adjacent the inlet 30 and outlet 32, respectively. An external region is shown generally as 206. In the exemplary embodiment, the housing 12 is generally symmetric about a vertical transverse center plane 208.

With the valve in an open condition, as shown in FIGS. 1 and 2, the gate 14 is in a lowered or stowed position, residing in a bay 34 of the housing. The gate 14 has first and second sealing members, such as sealing plates 36A, 36B, respectively (FIG. 2). Each sealing plate 36A, 36B has a longitudinally outboard plate 38A, 38B, and a longitudinally inboard plate 40A, 40B. Each outboard plate 38A, 38B is held flat against the associated inboard plate 40A, 40B such as by means of counter-bored screws 42. The outboard faces 44A, 44B of outboard plates 38A, 38B face the regions 202, 204, respectively, and each bears a generally rectangular slot in which a gasket 48A, 48B is carried. The inboard faces 46A, 46B of inboard plates 40A, 40B face toward the regions 204, 202, respectively, and form inboard faces of the sealing plates 36A, 36B, respectively.

Flexures or leaf springs 50A, 50B depend from the lower edges of the sealing plates 36A, 36B, respectively. Each flexure 50A, 50B is attached at its upper edge 52A, 52B to the lower edge of the associated inboard plate 40A, 40B. The bottom end 54A, 54B of each flexure 50A, 50B is secured to a transversely-extending cross-member 60 of a frame 62 (FIG. 1).

The frame 62 further includes a pair of posts or uprights 64A, 64B (FIG. 1) extending upwardly from the cross-member 60 at opposite ends of the cross-member. Extending along the laterally outboard faces of the uprights 64A and 64B, respectively, are a pair of outwardly facing channel members 66A, 66B. The channel members are of open rectangular section.

At opposite sides of the housing, pairs of upper and lower low friction guides 68A, 68B extend inwardly from respective sides 18A, 18B. The guides are accommodated within the associated channel members 66A, 66B so as to allow the channel members and gate 14 to slide vertically between the open position shown in FIGS. 1 and 2 and a closed position shown in FIGS. 4 and 5.

Figure 3:
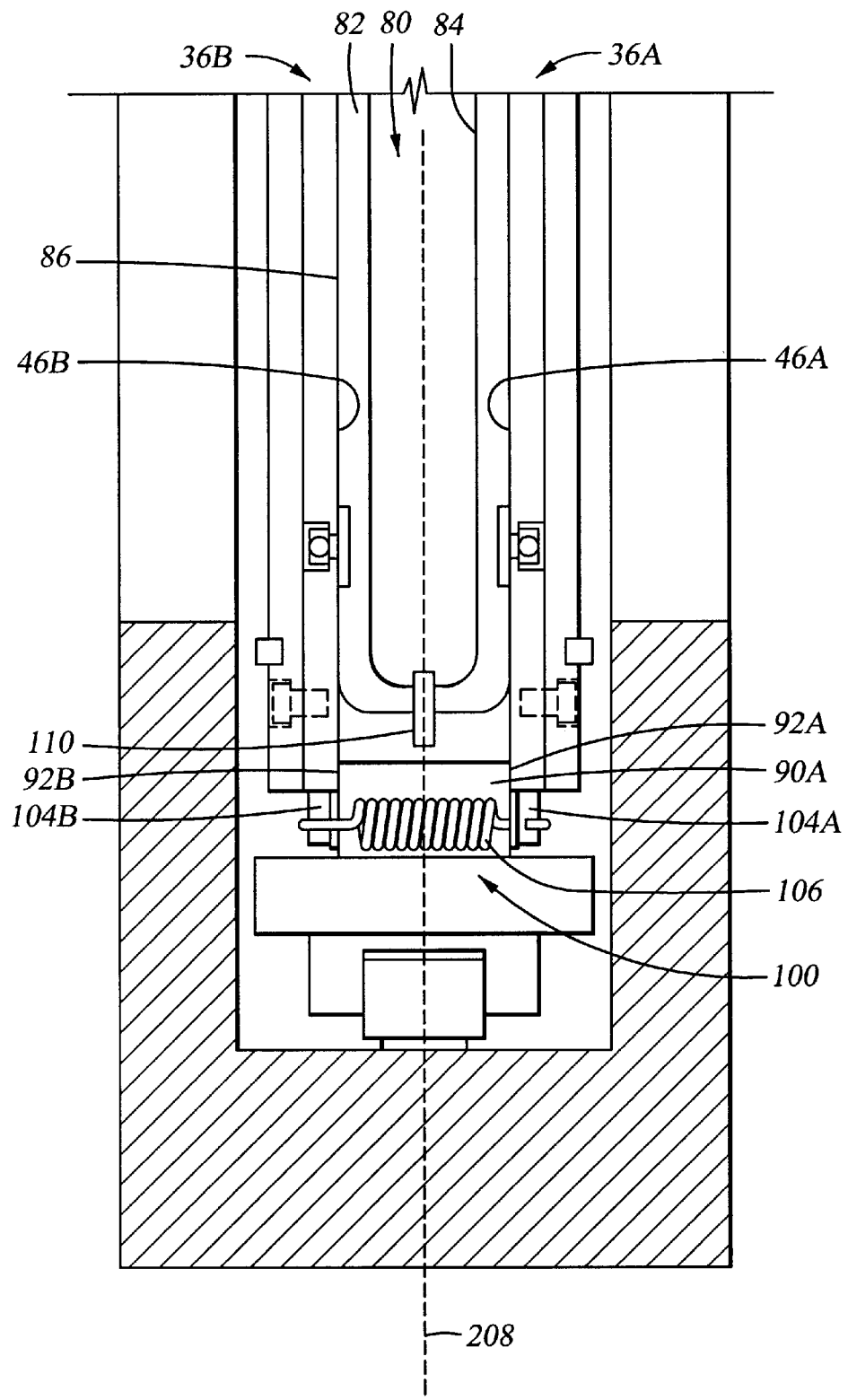
FIG. 3 is a top cross-sectional view of the valve of FIG. 2, taken along line 3—3.

Referring to FIG. 3, an expandable chamber or volume 80 which can be inflated is disposed within the housing. The chamber 80 is bounded by an expandable member, such as an inflatable elastomeric bladder 82 or a bellows, which is positioned between the sealing plates 36A and 36B. In the illustrated embodiment, the bladder 82 is continuous and substantially laterally coextensive with the sealing plates 36A, 36B, being slightly recessed from upper, lower and lateral edges of the plates. The bladder has an inner surface 84 surrounding the chamber 80 and an outer surface 86 which engages the inboard faces 46A, 46B of the sealing plates.

On each side of the gate 14, center blocks 90A, 90B (see also FIG. 1) are rigidly affixed to the associated uprights 64A, 64B and extend laterally inward slightly beyond the lateral edges of the sealing plates 36A and 36B. Contact between the inboard faces 46A, 46B of the sealing plates 36A, 36B and the adjacent sides 92A, 92B of the blocks restricts inward longitudinal movement of the sealing plates.

Above and below each center block 90A, 90B is a centering mechanism 100 (FIGS. 1 and 3). Each centering mechanism 100 includes a first pin 104A (FIG. 3) extending laterally outward from the associated side of the sealing plate 36A and a second pin 104B extending laterally outward from the associated side of the sealing plate 36B. A coil-type tension spring 106 connects the first pin 104A to the second pin 104B. Thus, collectively, the springs 106 of the centering mechanisms 100 bias the two sealing plates 36A, 36B toward each other and, thus, toward the transverse vertical center plane 208.

Figure 6:
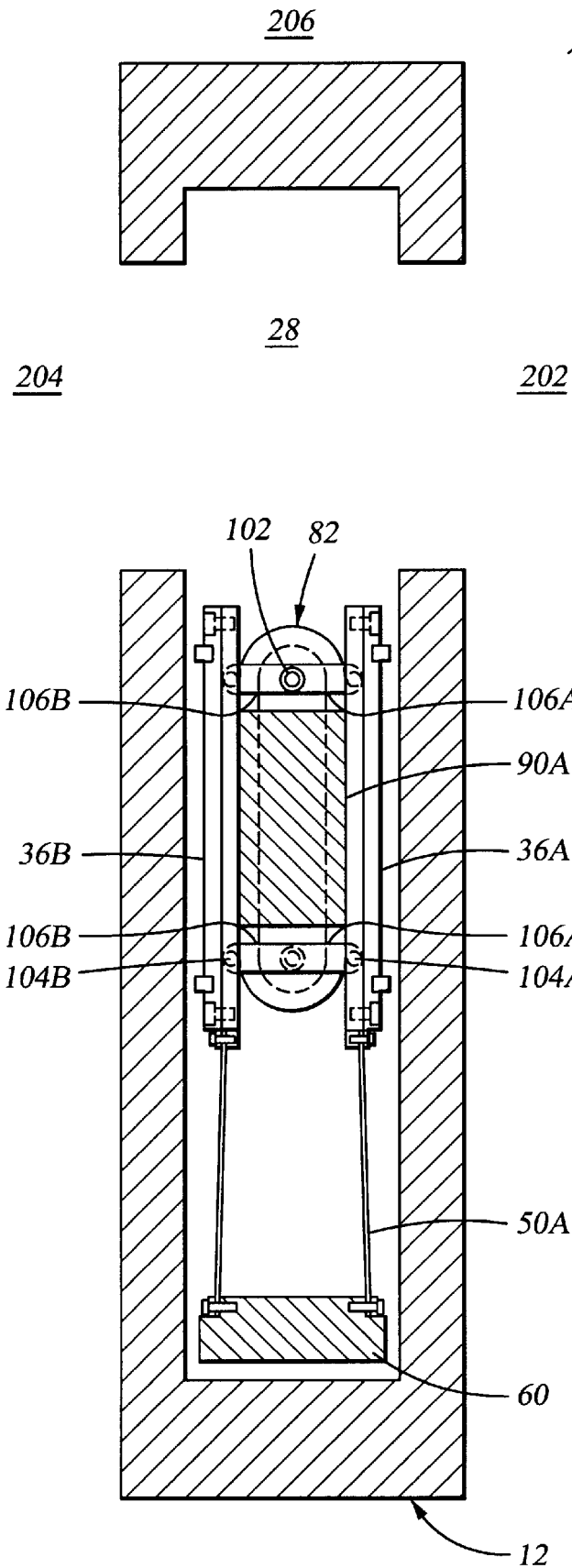
FIGS. 6 and 7 are partial transverse cross-sectional views of valves according additional implementations of the invention.

In an alternate embodiment shown in FIG. 6, each centering mechanism comprises a center pin 102 extending laterally inward from an associated upright 64A, 64B. An upstream coil-type tension spring 106A connects the first pin 104A to the center pin 102, and a downstream coil-type tension spring 106B connects the second pin 104B to the center pin 102. The springs 106A, 106B bias the sealing plates 36A, 36B toward the transverse vertical center plane 208.

Returning to FIG. 3, an inflation/deflation conduit 110 extends through the bladder 82 into the chamber 80. The conduit 110 can be directed between the flexures 50A, 50B and out through the actuator 16 to a remote source 112 (FIG. 1). In the exemplary embodiment, the source 112 can take the form of an appropriate pump along with the associated valves and control systems for selectively introducing a gas into the chamber 80 through the conduit 110 and withdrawing the gas from the chamber through the conduit 110 to inflate and deflate the chamber. A conduit 114 (FIG. 1) extends through the housing into the cavity 34. The conduit 114 is connected to a fluid source 116 which may be similar to a source 112. The fluid source 116 facilitates the selective pressurization and depressurization of the housing external to the chamber 80.

Figure 4:
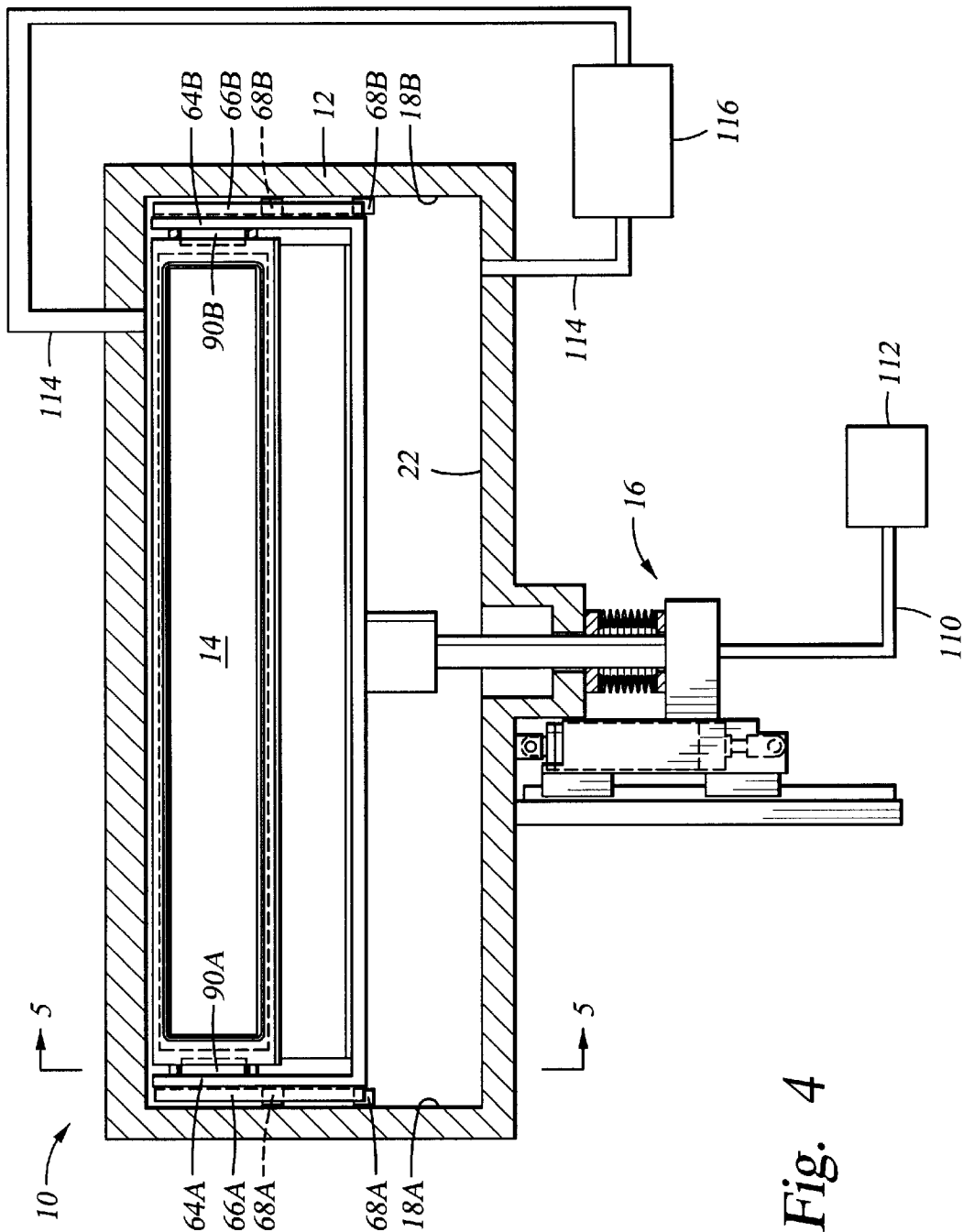
FIG. 4 is a transverse cross-sectional view of the valve of FIG. 1, shown in a closed configuration.
Figure 5:
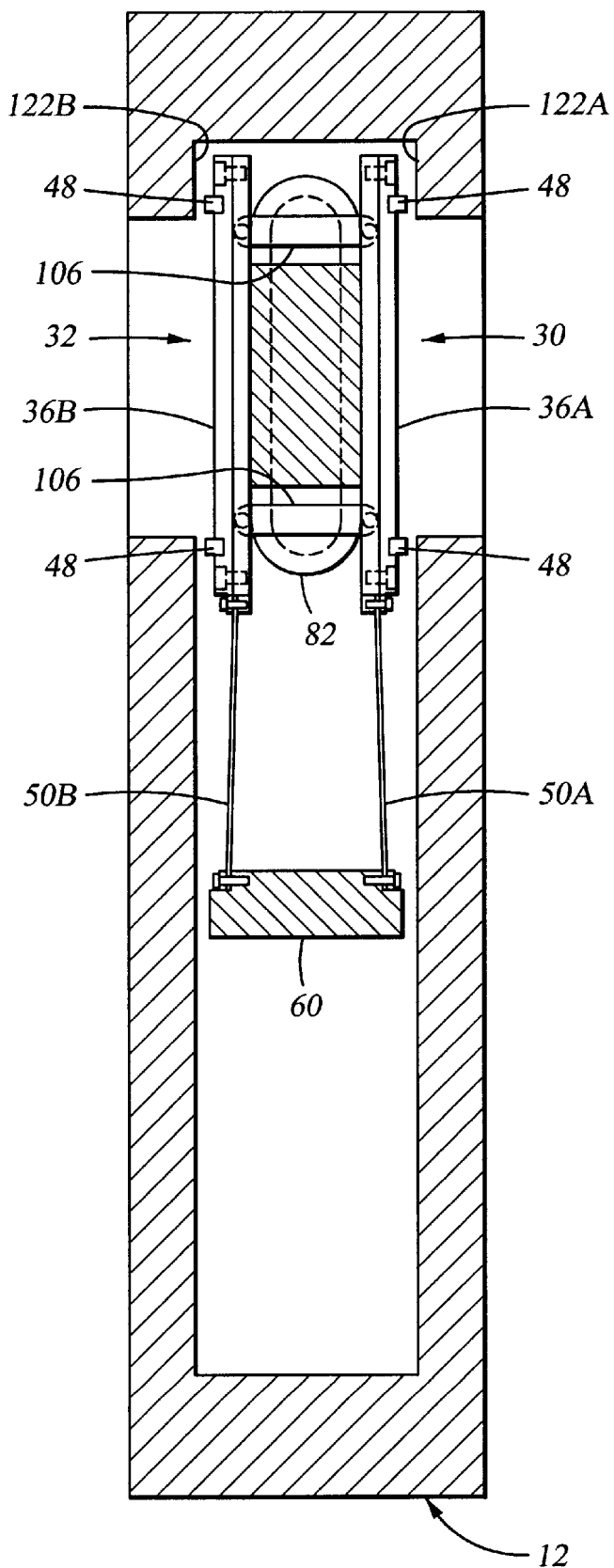
FIG. 5 is a partial longitudinal cross-sectional view of the valve of FIG. 4, taken along line 5—5.

To close the valve, the actuator 16 is controlled to raise the gate 14 from the lowered or stowed position (FIGS. 1 and 2) to a raised or deployed position (FIGS. 4 and 5). In the deployed position, the sealing plates 36A, 36B are aligned with and facing the inlet and outlet ports 30, 32, respectively. Valve seats 120A, 120B are formed in the housing surrounding the inlet and outlet ports 30, 32, respectively. The valve seats have seating faces 122A, 122B facing generally toward the regions 204, 202, respectively. The seating faces 122A, 122B respectively face and are aligned with the gaskets 48A, 48B when the gate 14 is in the deployed position.

With the gate 14 in the deployed position, the chamber 80 is inflated or pressurized, producing longitudinal outward forces on the sealing plates 36A, 36B. When the pressure in the chamber 80 is suecient, it will overcome the tension in the springs 106 and drive the sealing plates 36A, 36B longitudinally outward to place the gate 14 in an expanded condition. The longitudinally outward movement of the sealing plates 36A, 36B brings the gaskets into sealing engagement with the seating faces 122A and 122B, respectively (FIG. 5). In this way, the sealing plates 36A, 36B become sealingly engaged to the seats 122A, 122B of the respective inlet and outlet ports 30, 32 to prevent fluid flow through the ports. In this manner, the regions or chambers 202, 204 can be isolated from one another as well as from the passageway 28 in the valve housing.

To open the valve, the chamber 80 is deflated or depressurized, reducing the longitudinally outward forces on the sealing plates 36A, 36B. When the pressure in the chamber 80 is sufficiently reduced, the tension in the springs 106 overcomes the pressure difference across the respective plates 36A, 36B and overcomes any sticking of the gaskets 48A, 48B so as to disengage the sealing plates and gaskets from the seats 122A, 122B. Although the chamber 80 can be depressurized by venting to atmosphere, a vacuum may be applied to the chamber by the source 112 so that reduced pressure further assists the springs 106 to draw the plates together. With the chamber 80 returned to the unexpanded condition, the actuator 16 is controlled to lower the gate 14 from the deployed position to the stowed position, thereby clearing the channel 28.

Exemplary materials used in construction of the valve 10 include aluminum for the housing 12 and the plates 36A, 36B, although stainless steel can be used if there is to be exposure to chemicals which react with aluminum. The gaskets 48 can be formed of a flouroelastomer such as sold under the trademark VITON by E.I. du Pont de Nemours and Company. The gaskets 48 are secured in their associated grooves via bonding adhesive or via forming the grooves with a dovetail or similar profile to capture the gaskets. The flexures 50A, 50B can be formed of stainless steel sheets.

The dimensions of the valve 10 can be selected based on the particular application in which it is to be used. An exemplary application involves the sealing of chambers used in large glass substrate processing (e.g., separating a load lock chamber from a process chamber). For such an application the valve can be configured to accommodate passage of substrates between the chambers. In an exemplary embodiment suitable for large glass substrates, such as substrates having an area of one square meter, the ports 30, 32 are about 5–6 inches high and about 50 inches wide. The plates 36A, 36B can be approximately 1 inch greater in width and height than the ports 30, 32, and the bladder 82 approximately 0.5 inches greater in width and height than the ports.

When both plates are sealingly engaged to their respective ports, the pressure in the housing can be greater than the pressure in an adjacent processing chamber. The pressure in the housing can be at ambient pressure.

Furthermore, the ability to pressurize and depressurize the housing 12 external to the chamber 80 provides a number of options to the user. With a pressure in the chamber 80 designated $P_3$ (controlled via the source 112), and an ambient pressure designated $P_A$, a pressure $P_4$ in the housing can be controlled relative to any of $P_A$, $P_3$, and pressures $P_1$ and $P_2$ in the regions 202 and 204, respectively. In one option which is particularly useful when the difference between $P_1$ and $P_2$ is large, the housing 12 and chamber 80 can be pressurized simultaneously. Since the strength of the bladder 82 limits the amount by which $P_3$ may exceed $P_4$, the more $P_4$ is increased, the more $P_3$ may be increased so as to increase the sealing force. Furthermore, to the extent that the chamber 80 does not cover the entire area of the gate 14, the force applied by the pressure $P_4$ to those areas of the gate beyond the chamber will help seal the valve. This may be particularly useful where multiple discrete chambers, such as those formed by metal bellows are utilized. In a situation where the valve is used to seal a low pressure processing chamber from a higher pressure chamber or region, it may be particularly desirable to prevent contamination. In such a situation, a vacuum can be applied to the housing 12 to reduce the pressure $P_4$ so that any gas leaking from the high pressure chamber can be evacuated through the conduit 114.

Figure 7:
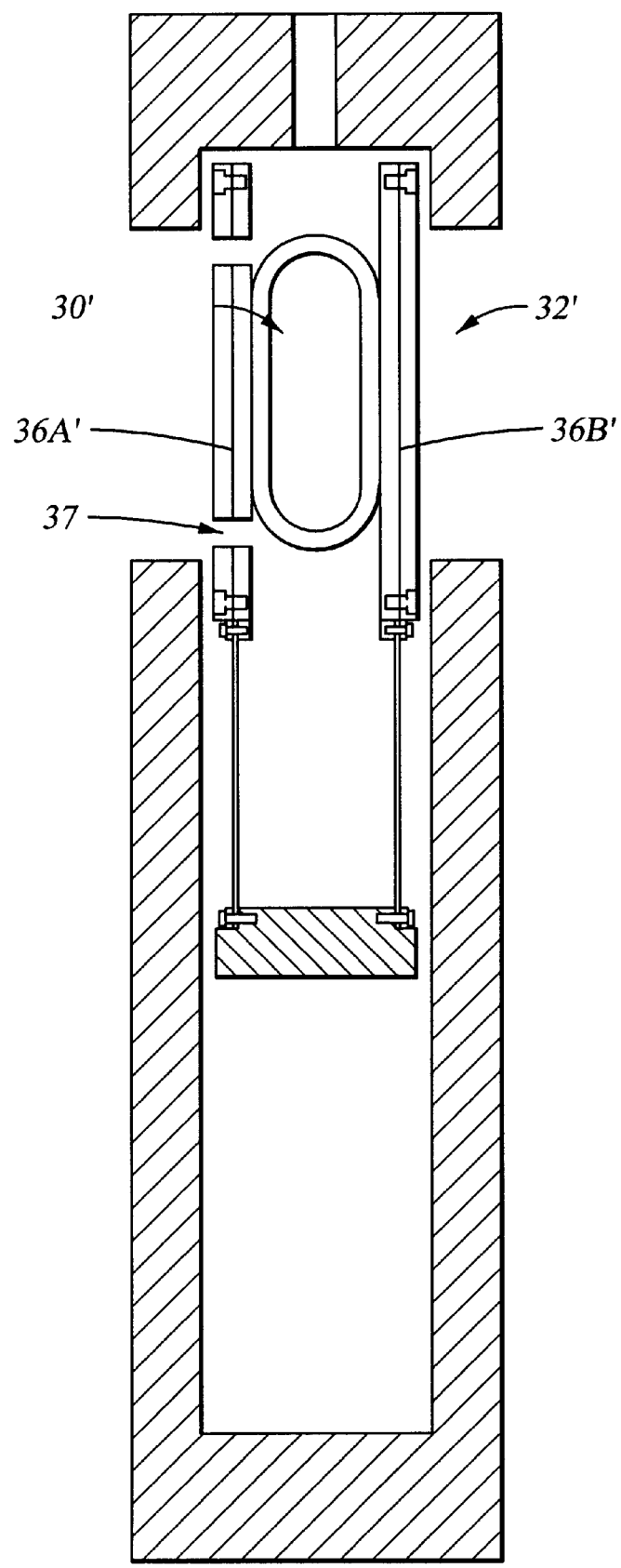

FIG. 7 shows an alternate valve having one sealing plate 36B' which generally is similar to the plates the 36A, 36B in FIGS. 1–6. In an exemplary application, an inlet 30' is coupled to a low pressure chamber which can be pressurized with inert gas. A second port 32' can be connected to a process chamber for low pressure processing in a reactant gas environment. The inert gas can flow through holes 37 in the plate 36A' to fill the housing. The pressure from the inert gas can augment the sealing in a similar fashion to the housing pressurization described above.

The use of an inflatable chamber 80 to separate the valve plates 36A, 36B and seal the valve 10 provides a significant degree of flexibility in valve design. The force (pressure distribution) separating the plates 36A, 36B can be distributed more evenly than in a purely mechanical system. For example, the force can be distributed substantially continuously along an elongate gate member. Valves as described and illustrated in FIGS. 1–7 can offer savings in cost, weight, size, and complexity.

Various modifications can be made to the implementations described above. For example, although in the illustrated embodiment the chamber 80 is formed by a generally rectangular continuous elastomeric bladder 82, one or more bladders of other geometries may be used. The chamber 80 can be formed other than by an elastomeric bladder, such as by one or more bellows. In general, the chamber 80 includes an expandable member which can be expanded from a first condition to a second condition and which can be contracted from the second condition to the first condition. In the first condition, the gate is moveable between the stowed and deployed positions, and in the second condition, with the gate in the deployed position, the first and second sealing members are biased apart from each other by expansion of the expandable member so that the outward-facing surface of at least one sealing member is sealingly engaged to a respective one of the ports so as to seal the first region from the second region.

Additionally, although the valve illustrated in FIGS. 1–6 is substantially symmetric about its transverse central plane, asymmetric valves also can be provided. Various actuators and gate geometries may be used and many specific properties of the valve may be influenced or dictated by the particular application for which the valve is designated or adapted.

In the implementations described above with respect to FIGS. 1–6, the sealing plates 36A, 36B are controlled substantially simultaneously to engage their respective seats 122A, 122B and to isolate the regions 202, 204.

In contrast to the foregoing description, as an alternative embodiment, FIGS. 8–19 illustrate a substrate chamber with mechanical isolation valves. The implementations described below allow passageways in adjacent chambers to be sealed independently of one another. Moreover, the valves described below include mechanically actuated gates which provide a horizontal force component to enhance the seal between the gate and the valve seat.

Figure 8:
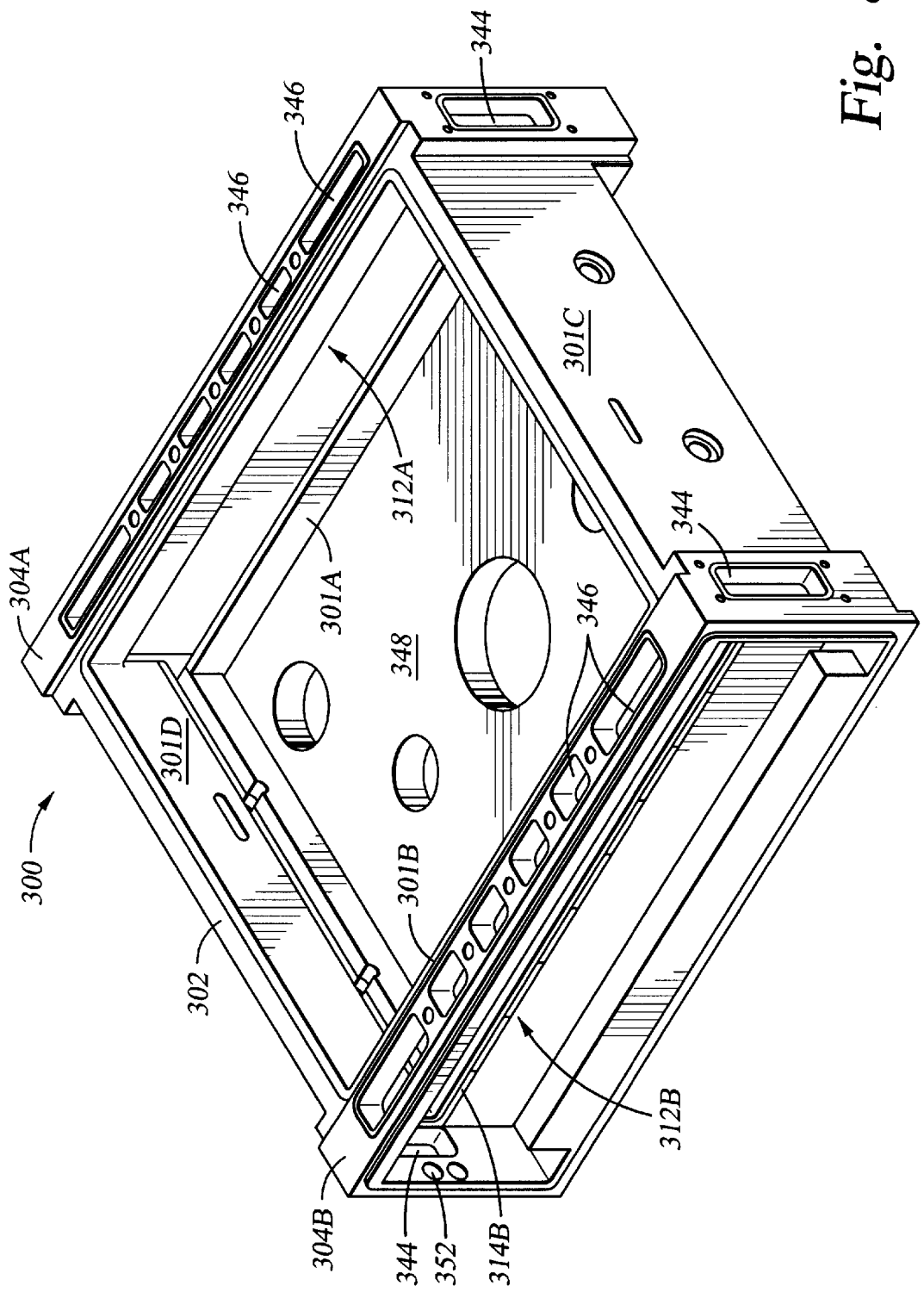
FIG. 8 is a partial elevated view of a chamber according to yet another implementation of the invention.
Figure 9:
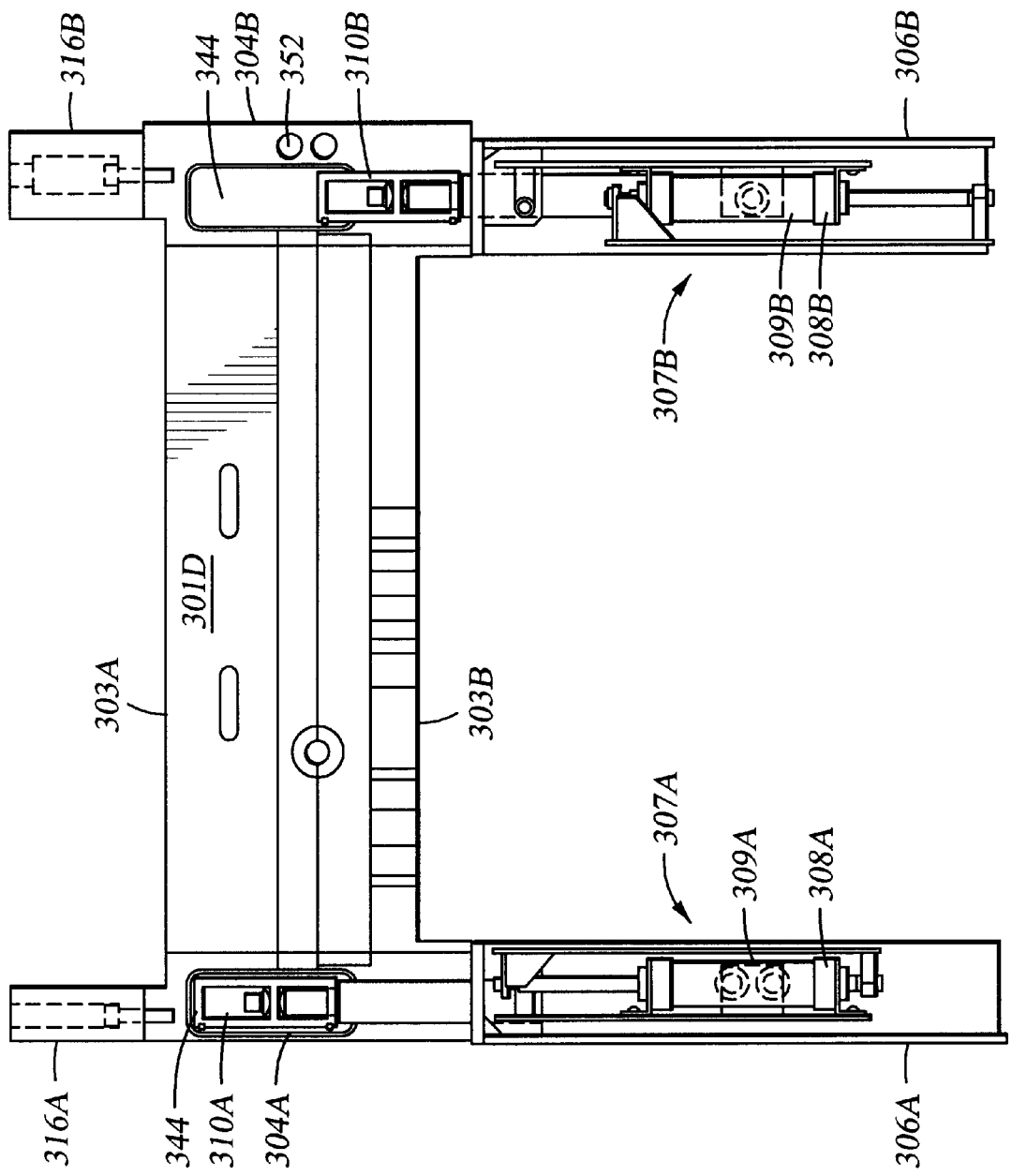
FIG. 9 is a side view of the chamber of FIG. 8 with actuator housings.

Referring to FIGS. 8–9, a chamber 300, such as a chemical vapor deposition (CVD) or other substrate processing chamber, includes a frame 302, having sidewalls 301A–301D, a top 303A and a bottom 303B. The valve housings 304A, 304B are integrally formed with the sidewalls 301A, 301B of the chamber 300 so that the valve housings and the chamber form a single unit. The valve housings also can be formed separately and then bolted or otherwise attached to the chamber. As discussed in greater detail below, the valve housing 304B is wider than the valve housing 304A in a direction parallel to the chamber sidewalls 301C, 301D.

An opening or passageway 312B is formed in the sidewall 301B of the chamber 300. Another opening or passageway 312A is formed in the opposite sidewall 301A. The dimensions of the passageways 312A, 312B can be selected to allow a substrate to be transferred in and out of the chamber 300 through the passageways. An outward-facing surface along the perimeter of the passageway 312B forms a seat 314B for engaging an associated gate 310B, and a similar seat is formed by an outward-facing surface along the perimeter of the passageway 312A to engage an associated gate 310A. The respective surfaces that form the seats, such as the seat 314B, face away from the interior of the chamber 348. The gates 310A, 310B can be formed as sealing plates. In one implementation, the sealing plates 310A, 310B have a length of approximately 50 inches, and a height of approximately 5–6 inches. Such an implementation is suitable for large glass substrates on the order, for example, of one square meter. Each valve housing 304A, 304B has an open side opposite the respective passageways 312A, 312B.

Reinforcement members 316A, 316B can be provided above the valve housings 304A, 304B to reinforce the chamber frame 302. Respective actuator housings, or frames, 306A, 306B are bolted or otherwise secured to the chamber 300 below the valve housings 304A, 304B. The actuator housings 306A, 306B provide stiffness for the chamber 300. The actuator housing 306A and the valve housing 304A are configured so that the actuator housing extends slightly beyond the valve housing in a direction parallel to the sidewalls 301C, 301D and away from the chamber interior 348. Similarly, the actuator housing 306B and the valve housing 304B are configured so that the valve housing extends slightly beyond the actuator housing in a direction parallel to the side-walls 301C, 301D and extending away from the chamber interior 348. Such an asymmetric configuration allows multiple chambers to be aligned adjacent one another as discussed further below with respect to FIG. 19.

Each actuator housing 306A, 306B contains a respective actuator 307A, 307B. Each actuator 307A, 307B includes a respective lift mechanism 308A, 308B for lifting and lowering an associated one of the gates 310A, 310B disposed within the valve housings 304A, 304B. Each actuator housing 307A, 307B also includes a respective rotating mechanism 309A, 309B coupled to an associated one of the lift mechanisms 308A, 308B, as well as coupled to as associated one of the gates 310A, 310B.

Each lift mechanism 308A, 308B can be raised from a first lowered position to an intermediate or raised position. The lift mechanisms 308A, 308B also can be rotated from the intermediate raised position to a second closed position by actuating the associated rotating mechanism 309A, 309B. In the closed position, the gates 310A, 310B engage their respective seats 314A, 314B and seal the chamber 300 from the valve housings 304A, 304B. When the gate is in its second closed position, a horizontal force component is provided to seal the gate against the passageway.

The lift mechanisms 308A, 308B also can be returned to their respective lower positions. Moreover, the lift mechanisms 308A, 308B can be controlled independently of one another. As shown in FIG. 9, the lift mechanism 308B is in the first (lowered) position, and the gate 310B does not engage its seat. The lift mechanism 308A, however, is shown in its raised position with the rotating mechanism 309A actuated so that the gate 310A engages the seat 314A (FIG. 8) and seals the chamber 300 from the housing 304A.

Figure 10:
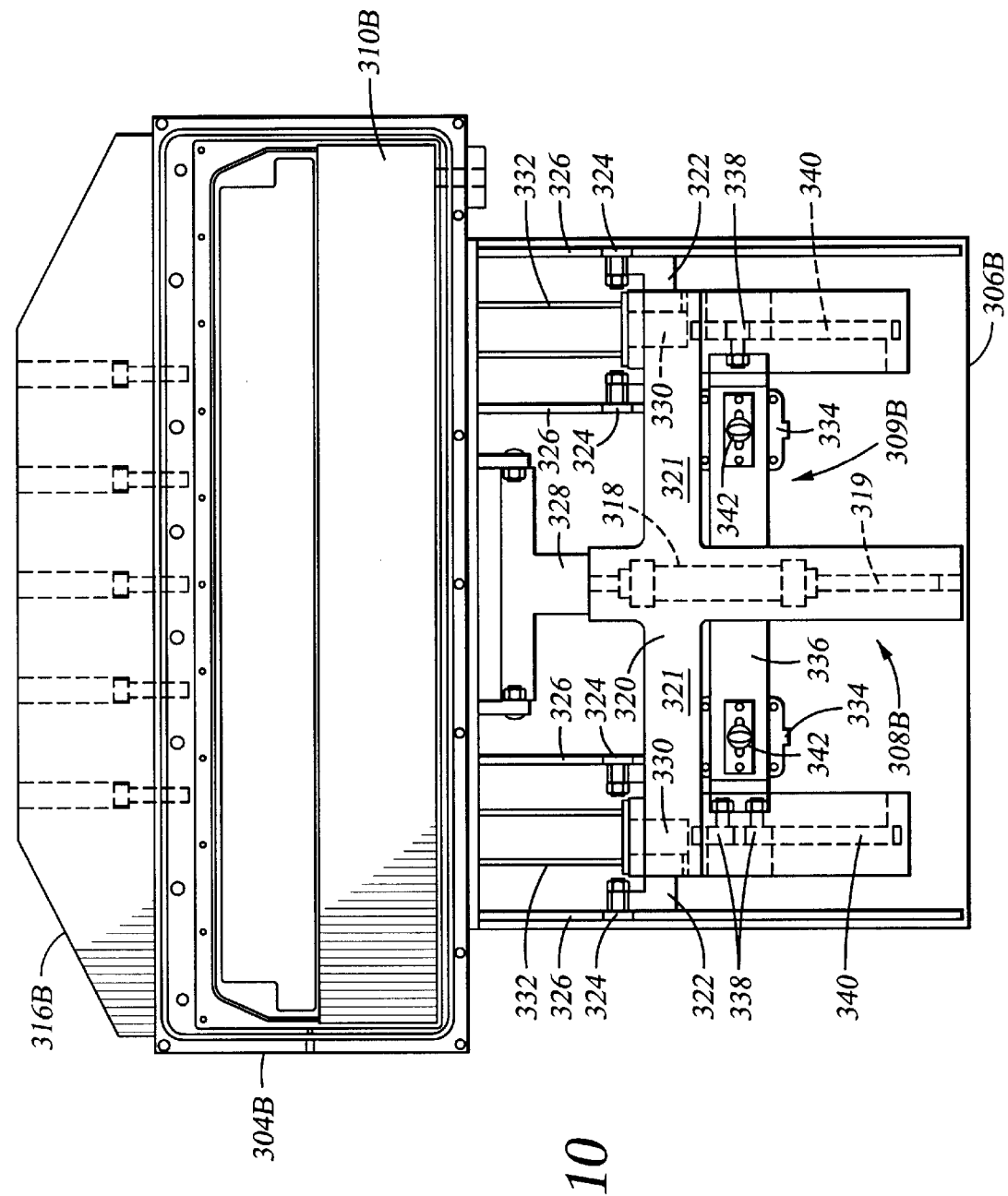
FIG. 10 is a side view of the chamber of FIG. 8 showing a lift mechanism in a lowered position.

Referring to FIG. 10, each lift mechanism, such as the lift mechanism 308B, includes a central lift cylinder 318 mounted to a pivot plate 328. The lift cylinder 318, which has a piston rod 319 extending vertically through its major axis, is coupled to a lift plate 320. The lift plate 320 includes substantially horizontal sections 321 that extend laterally outward. A respective rod block 322 is coupled to the lift plate 320 at each of its laterally extending ends 321. Each rod block 322 has multiple cam followers or wheels 324 which allow the rod block 322 to slide vertically up or down along stationary vertical slots 326 disposed within the housing 306B. The lower section of each rod block 322 includes a vertical slot 340 (FIG. 10) whose function is explained below.

Figure 11:
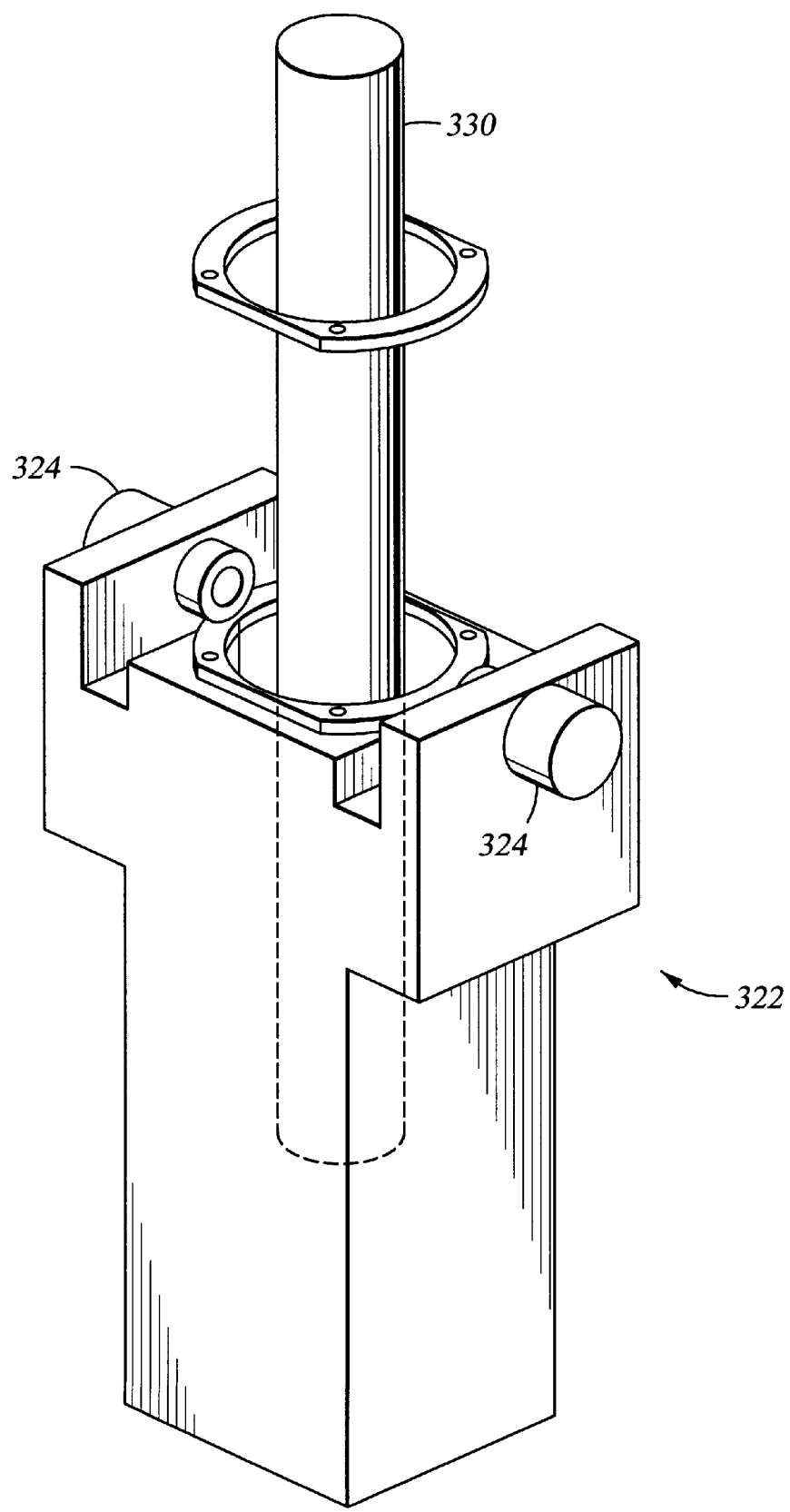
FIG. 11 illustrates a rod block which forms part of the lift mechanism in FIG. 10.
Figures 15A, 15B, 15C:
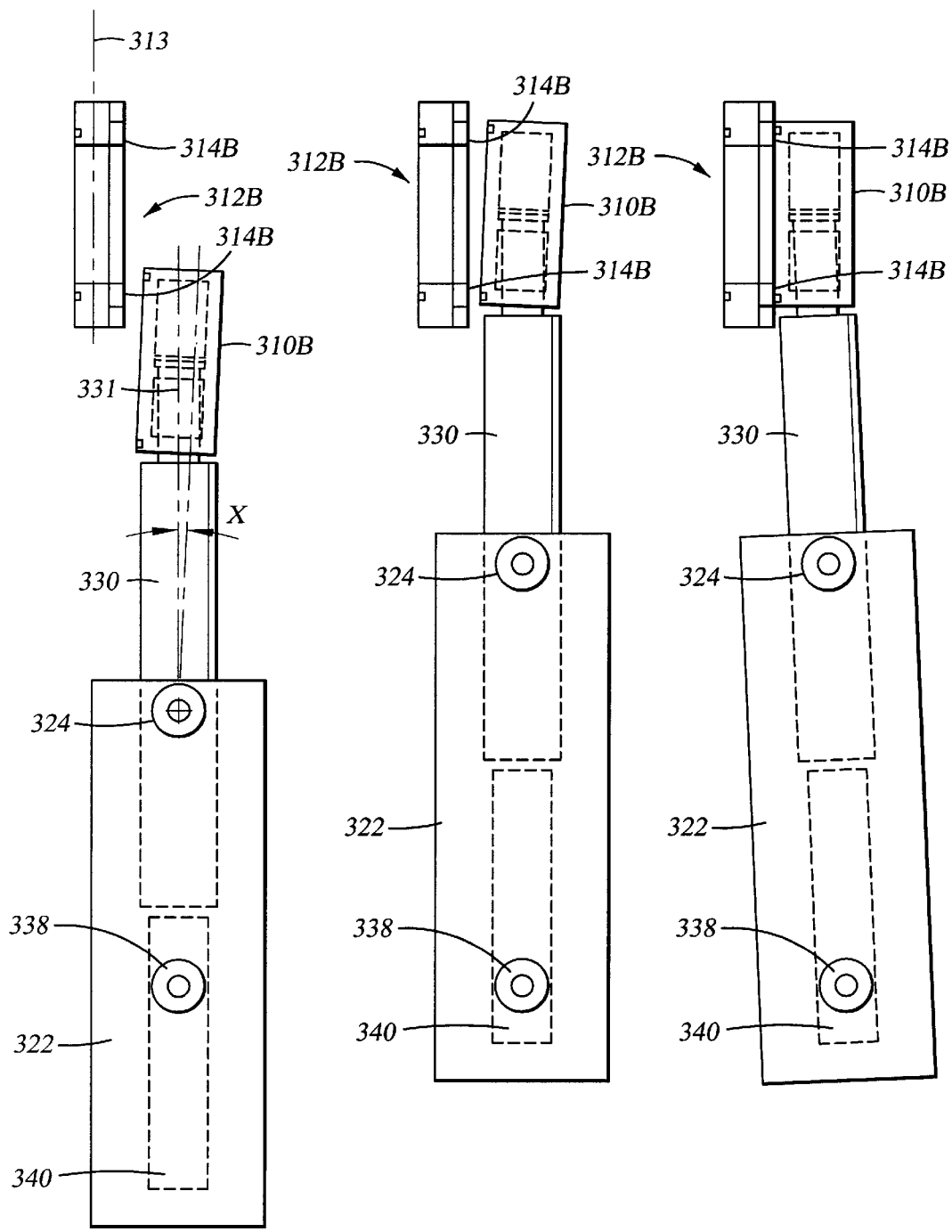
FIGS. 15A–15C illustrate the sealing plate between a lowered position, a raised position and a closed position, respectively.

As shown in FIGS. 10–11, each rod block 322 carries a vertical shaft 330, the lower end of which extends at least partially into the rod block 322 in a fixed position and is substantially parallel to the major axis of the rod block 322. The upper end of each shaft 330 extends through a respective compressible bellows 332 and is coupled at its upper end to the gate 310B (not shown in FIG. 10). The bellows 332 help maintain the pressure or vacuum as the shafts 330 are moved upward or downward. The gate or sealing plate 310B is offset slightly with respect to the vertical axis 331 of the shaft 330 (FIG. 15A). A spherical alignment joint 358 (FIG. 19) helps provide the desired alignment between the sealing plate 310B and the seat 314B. In the illustrated implementation, the sealing plate 310B and the vertical axis 331 of the shaft 330 form an angle x of at least 0.5 degrees, for example, approximately 1.3 degrees (FIG. 15A). In some implementations, however, the angle x can be less than 0.5 degrees yet greater than 0 degrees.

Figure 12:
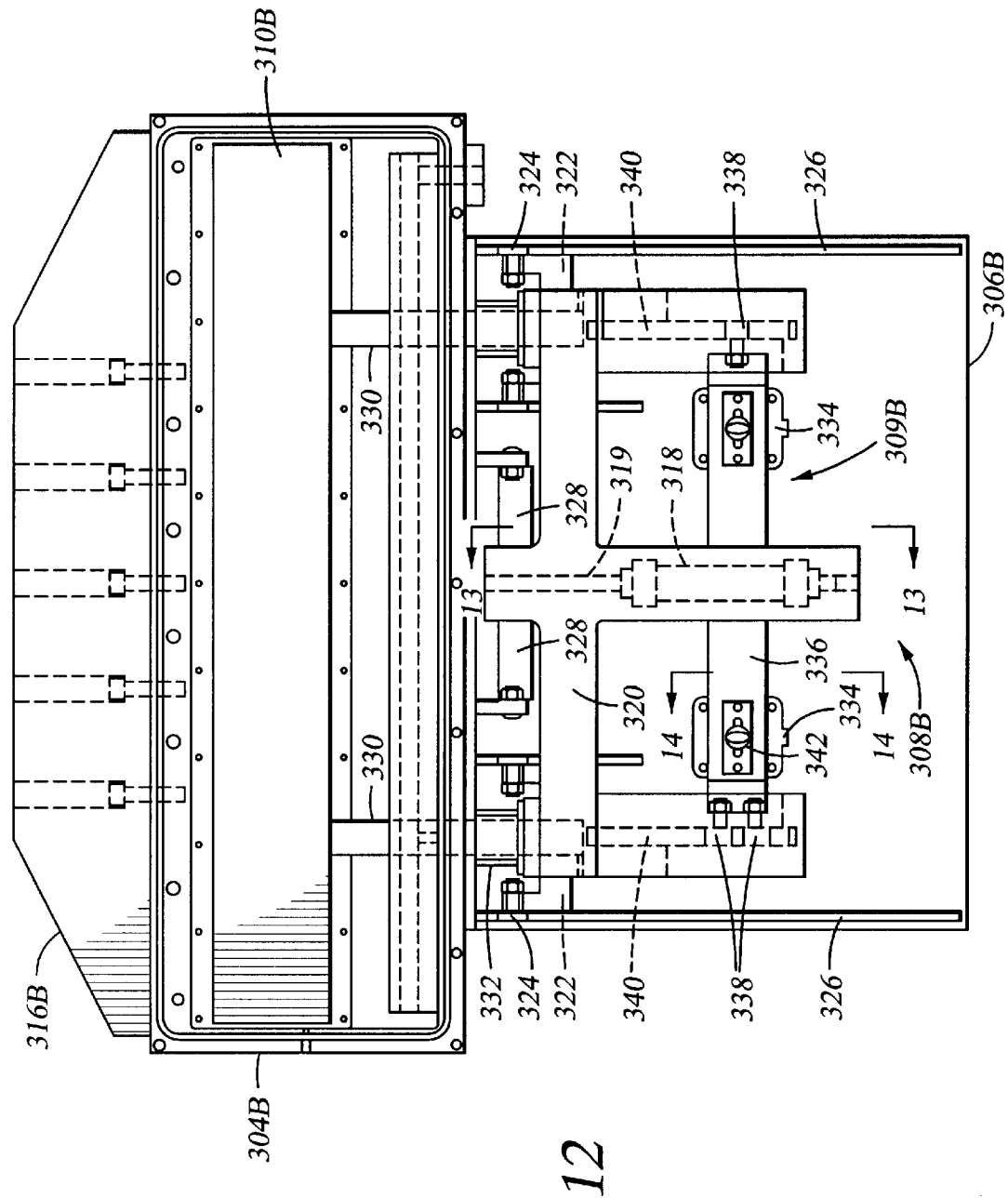
FIG. 12 is a side view of the chamber of FIG. 8 showing the lift mechanism in a raised position.
Figure 14:
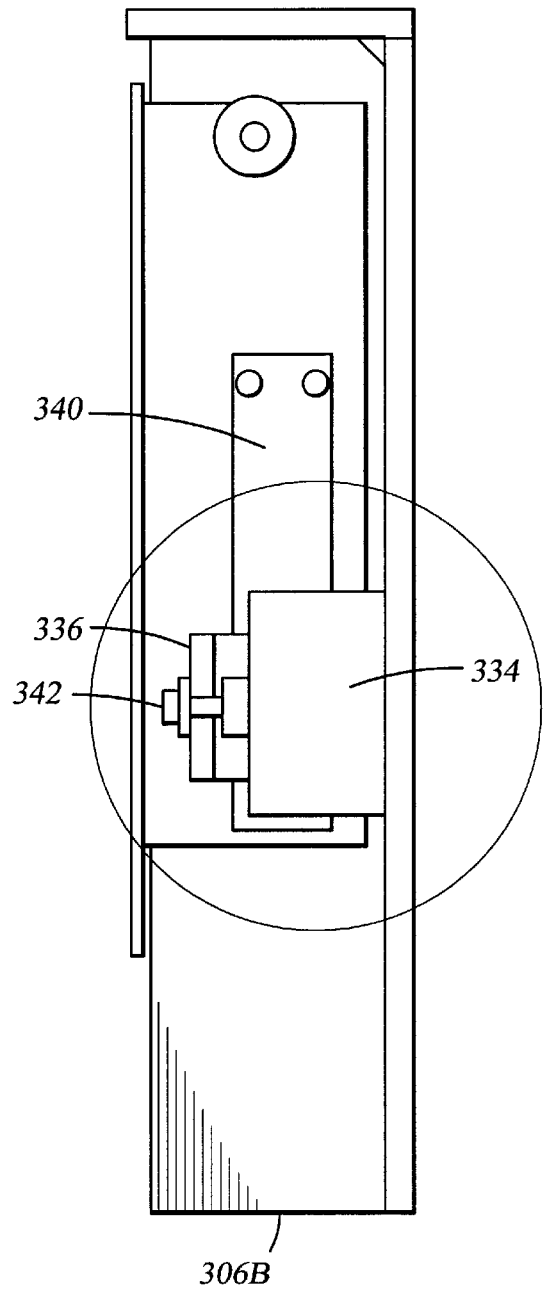
FIG. 14 is a side view of the lift mechanism taken along line 14—14 in FIG. 12.

In one implementation, the rotating mechanism 309B includes at least one push cylinder 334 coupled to a push plate 336 by spherical rod ends 342 (see FIGS. 10, 12 and 14). The illustrated implementation includes a pair of push cylinders 334. Distal ends of the push plate 336 are coupled to low friction cam followers or wheels 338. To maintain the desired orientation of the push plate, the push plate 336 is coupled to a total of three cam followers 338. When the rod blocks 322 are moved vertically upward or downward, the vertical slot 340 disposed within the lower section of each rod block 322 slides along the cam followers 338 which remain substantially stationary.

When the lift cylinder 318 is in its first or lowered position (FIGS. 10 and 15A), the sealing plate 310B is positioned slightly lower than the passageway 312B between the interior 348 of the chamber 300 and the valve housing 304B (FIG. 15A). In this first lowered position, the top of the sealing plate 310B is displaced slightly outward from the lower portion of the seat 314B. As noted above, in the illustrated implementation, the sealing plate 310B is offset slightly from the vertical axis 331 of the shaft 330 as well as from the vertical axis 313 of the seat 314B.

The lift cylinder 318 can be controlled to move the sealing plate 310B from the lower position to the raised intermediate position opposite the passageway 312B to the chamber 300.

Figure 13:
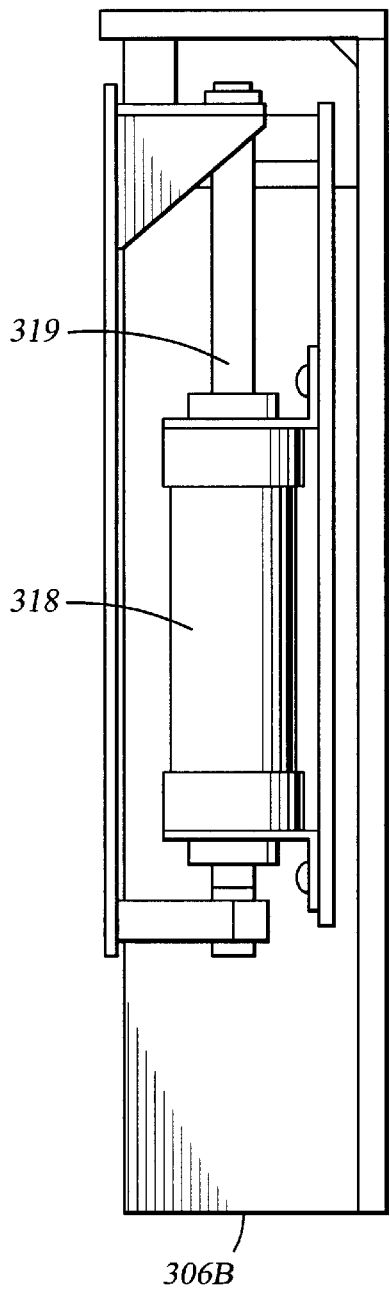
FIG. 13 is a side view of the lift mechanism taken along line 13—13 in FIG. 12.

In particular, the lift cylinder 318 causes the piston rod 319 to move vertically upward (FIGS. 12–13). Upward movement of the piston rod 319 lifts the entire lift plate 320 and the attached rod blocks 322 upward. Upward movement of the rod blocks 322 lifts the shafts 330 upward, thereby moving the sealing plate 310B to the raised position opposite the passageway 312B (FIG. 15B). In this intermediate raised position, the sealing plate 310B is not yet sealed against the seat 314B, and the top of the sealing plate tilts away from the passageway 312B.

To seal or close the passageway 312B, air pressure in the push cylinders 334 is reversed to move the push cylinders from respective first or extended positions to respective second or contracted positions. As the cylinders 334 move to their contracted positions, the push plate 336 moves slightly outward away from the chamber 300. The lateral outward movement of the push plate 336 causes the lift plate 320, the rod blocks 322 and the shafts 330 to rotate slightly so that the sealing plate 310B is moved flush against the seat 314B surrounding the passageway 312B (FIG. 15C). Specifically, in the illustrated implementation, the sealing plate 310B is rotated approximately 1.3 degrees, thereby moving the sealing plate to its second or closed position and sealing the chamber passageway 312B. When the sealing plate 310B is flush against the seat 314B, fluid communication between the chamber interior 348 and the interior of the valve housing is prevented through the passageway 312B.

Figure 16:
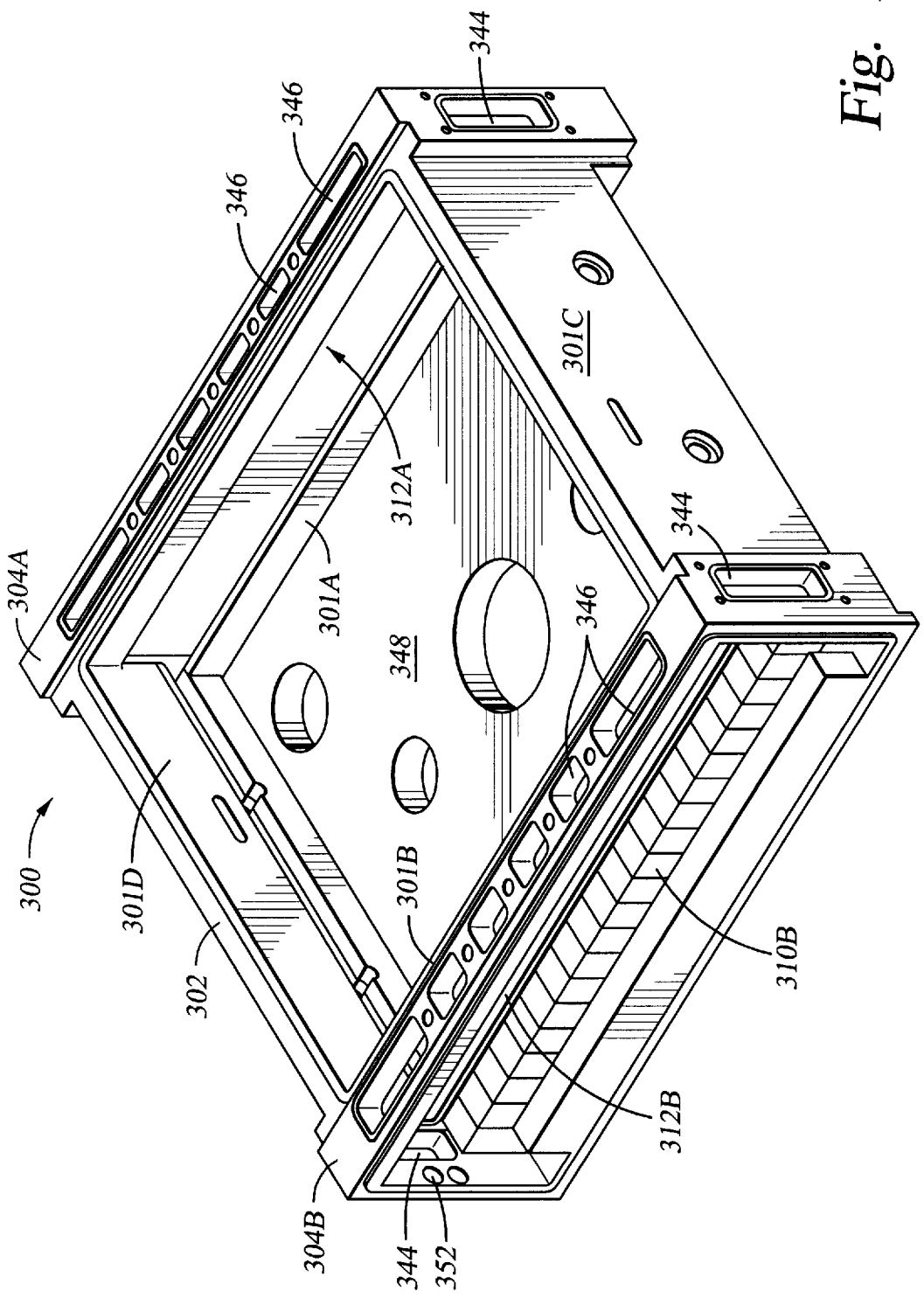
FIGS. 16–17 are partial elevated side views of the chamber of FIG. 8 with a sealing plate positioned in lowered and raised (or closed) positions, respectively.

To unseal or open the passageway 312B and move the sealing plate 310B to its lowered position, the procedure described above is reversed. The air pressure in the push cylinders 334 again is reversed to move the push cylinders to their respective extended positions. In some implementations, the pressure of the push cylinders 334 is changed substantially simultaneously. In other implementations, particularly when the seal created between the sealing plate 310B and the seat 314B is tight, the pressure of one push cylinder 334 can be changed prior to changing the pressure of the other push cylinder. As the seal is loosened, the sealing plate 310B rotates back to its raised intermediate position in which the sealing plate is opposite, but not in contact with, the seat 314B (FIG. 15B). The lift cylinder 318 then can be controlled to bring the sealing plate 310B to its lower position in which the top of the sealing plate 310B is opposite the lower portion or bottom of the seat 314B (FIG. 15A). In other words, the top of the sealing plate 310B can be substantially at least as low as the bottom of the passageway 312B. The sealing plate 310B remains disposed within the valve housing 304B even when the sealing plate is in the lower position (FIG. 16).

The sealing plate 310A and the actuator 307A operate in substantially the same manner as the sealing plate 310B and the actuator 307B.

In some implementations, the sealing plate 310B need not be offset from the vertical axis 331 of the associated shaft 330. Rather, the sealing plate 310B and the associated shaft 330 can be substantially parallel to one another. In such an implementation, when the lift mechanism 308B is in its lowered position, the sealing plate 310B, as well as the associated shaft 330, is slightly offset from the vertical axis of the 313 of the seat 314B such that the top of the sealing plate tilts away from the seat. Once the lift mechanism 308B is moved to its intermediate raised position, the push cylinders 334 cause the sealing plate 310B and the shaft to rotate so as to move the sealing plate to its closed position, thereby sealing the chamber passageway 312B. When the gate 310B is in its closed position, the sealing plate 310B, the associated shaft 330 and the vertical axis of the seat 314B are substantially parallel to one another.

Figure 17:
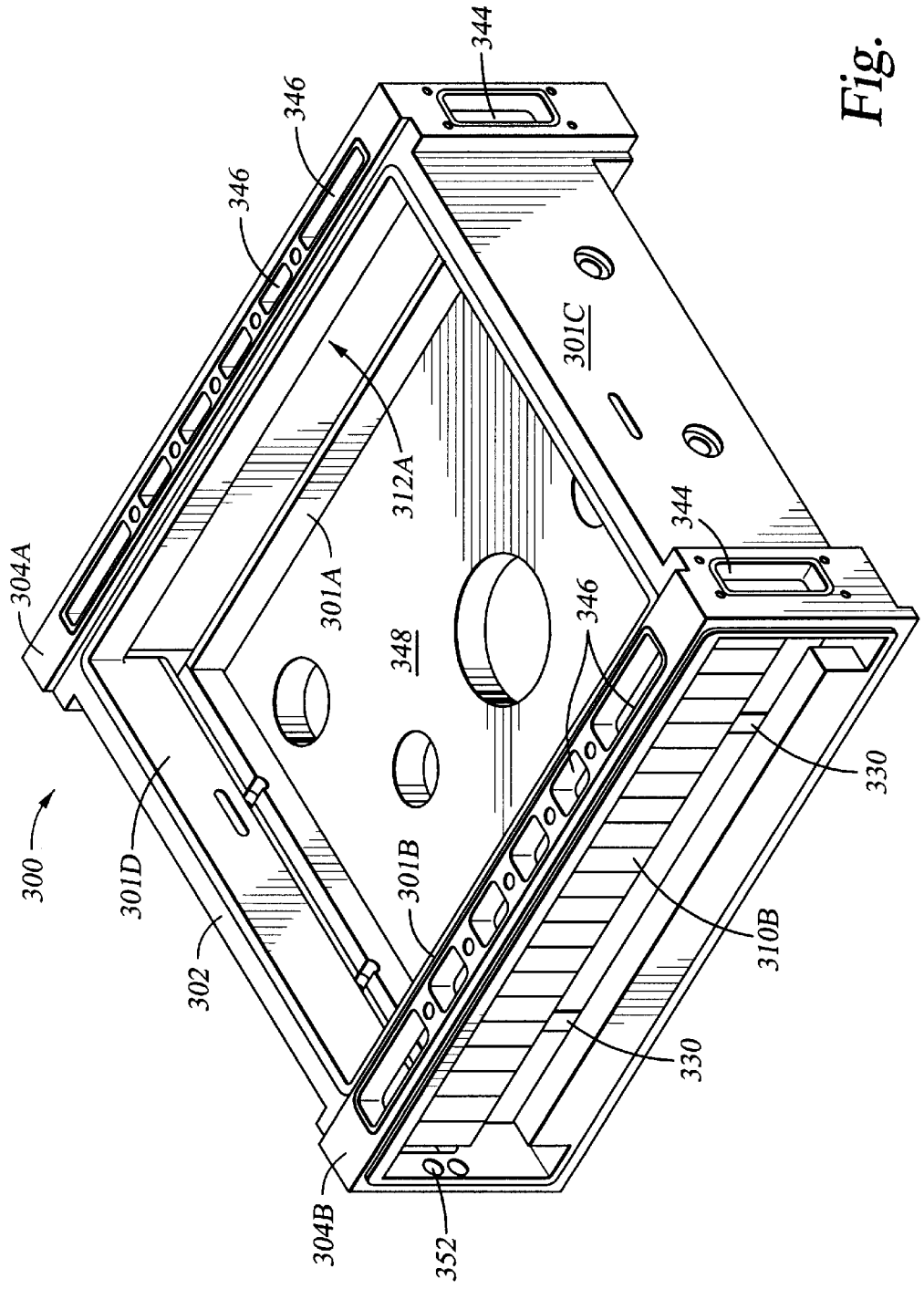

Referring again to FIG. 8, each of the valve housings 304A, 304B includes openings 344 that are substantially perpendicular to the passageways 312B, 312A in the interior 348 of the chamber 300. The openings 344 are configured such that when the sealing plate 310B (or 310A) is in its raised position, the openings 344 in the valve housing 304B are substantially parallel to the width of the sealing plate (FIG. 17). The dimensions of the openings 344 are configured to be slightly larger than a cross-section of the sealing plates 310A, 310B so that the sealing plates can be removed from their respective housings 304A, 304B via the openings for maintenance or inspection. The valve housings 304A, 304B also have one or more openings 346 through their respective top surfaces. The openings 346 aid visual inspection of alignment of the sealing plates 310A, 310B, as well as the removal of the sealing plates and other maintenance functions.

Figure 18:
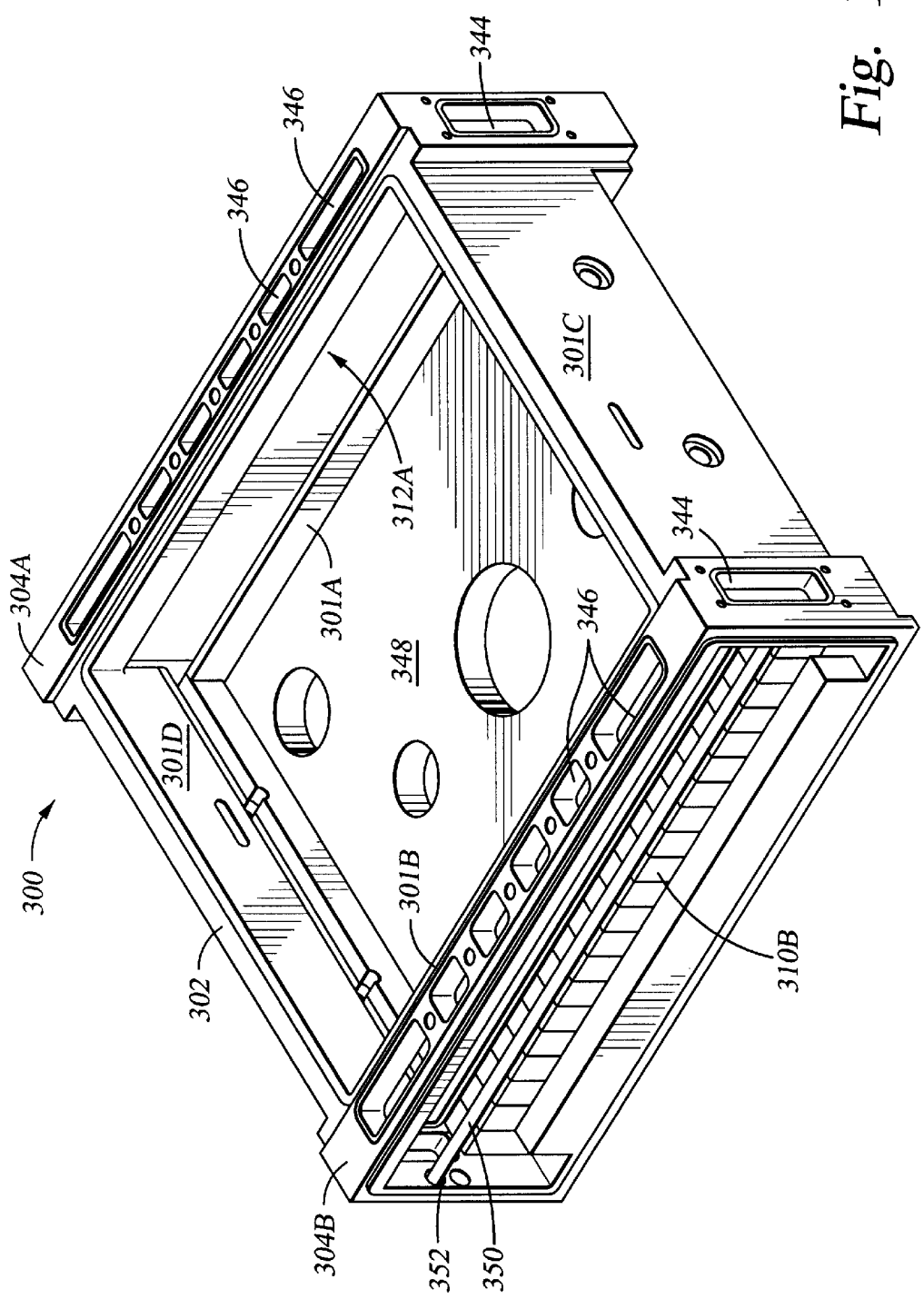
FIG. 18 is a partial elevated side view of the chamber of FIG. 16 including a drive mechanism for a substrate transfer shuttle.

As noted above, the valve housing 304B is somewhat wider than the valve housing 304A in a direction parallel to the chamber sidewalls 301C, 301D. Referring to FIGS. 8 and 18, the valve housing 304B includes one or more openings 352 which serve as a vacuum feed through for a drive mechanism 350 of a substrate transfer shuttle or other substrate transfer mechanism (not shown) that transfers substrates between process chambers. In the illustrated implementation, the opening 352 is located adjacent one of the openings 344, and the drive mechanism 350 is disposed within the valve housing 304B. Further details of an exemplary drive mechanism 350 and substrate transfer shuttle are described in the previously mentioned U.S. application entitled "Method and Apparatus for Substrate Transfer and Processing" [attorney docket 2519/US/AKT (05542/235001)].

Figure 19:
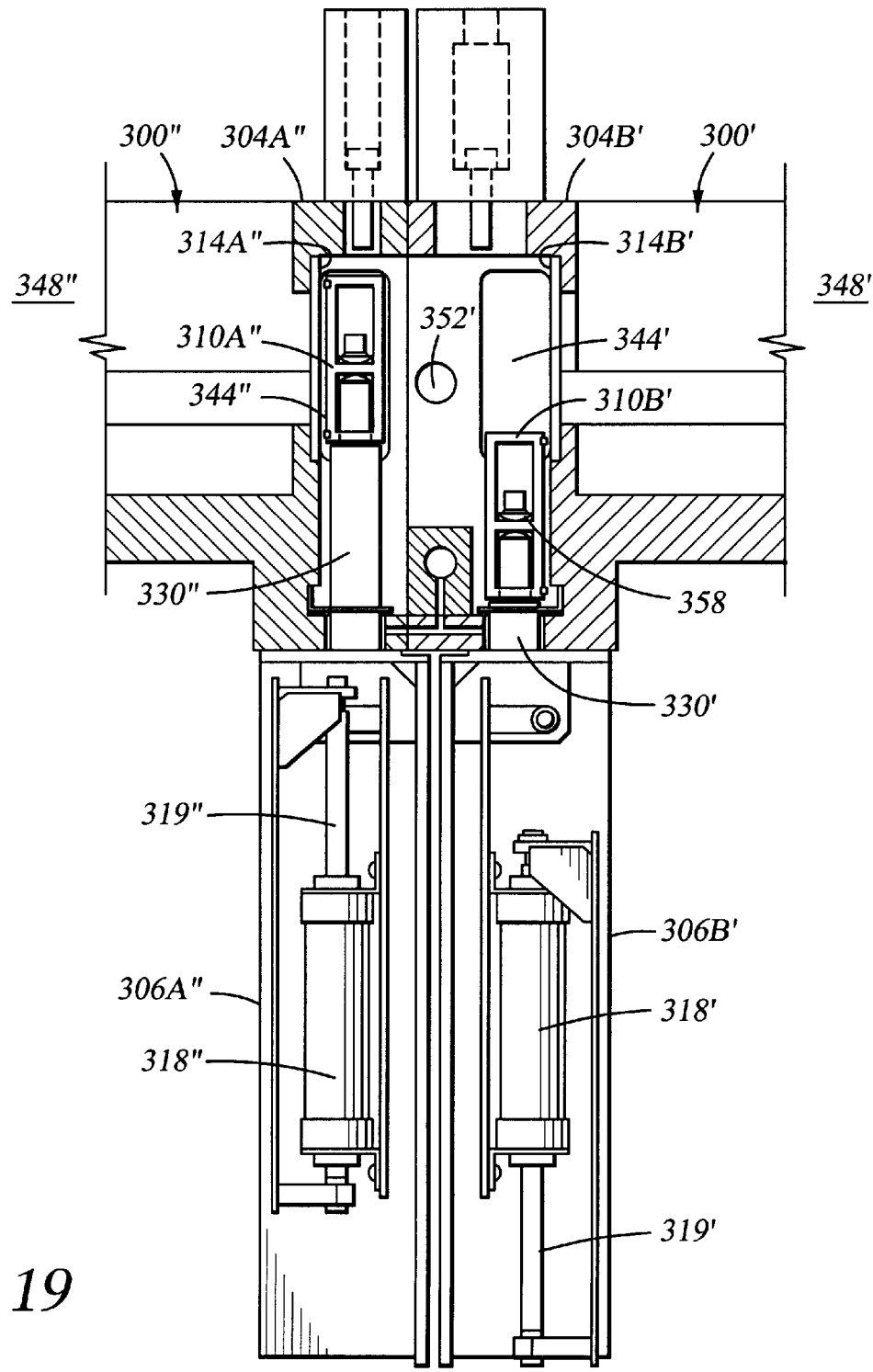
FIG. 19 illustrates two chambers positioned adjacent one another according to the invention.

As shown in FIG. 19, a first chamber 300' and a second chamber 300", each of which has a construction similar to that of the chamber 300, can be aligned to permit a substrate to be transferred from one chamber to the other and vice-versa. Features of the chambers 300', 300" are designated with reference numerals which identify similarly-numbered features of the chamber 300. Thus, the first chamber 300' has an interior 348', a valve housing 304B', and an actuator housing 306B'. The valve housing 304B' includes an opening 352' to serve as a feed through for the drive mechanism of a substrate shuttle transfer. As shown in FIG. 19, the sealing plate 310B' is in its lowered position. Similarly, the second chamber 300" has an interior 348", a valve housing 304A", and an actuator housing 306A". As shown in FIG. 19, the sealing plate 310A" is in its raised position.

Due to the asymmetry between the respective valve housings 304B', 304A" and the actuator frames 306B', 306A", the valve housing 304B' of the first chamber 300' partially extends over the actuator frame 306A" of the second chamber 300" when the chambers are positioned adjacent one another and coupled to one another. The construction of the chambers 300', 300" increases the ease with which two or more chambers can be coupled together as part of a modular system having multiple chambers. The chamber construction also increases the overall compactness of the system.

When both sealing plates 310B', 310A" are in their respective lower positions, a substrate can be transferred from one chamber to the other. When both sealing plates 310B', 310A" are in their respective raised and sealed positions, the area between the two sealing plates is isolated from the interiors 348', 348" of the chambers 300', 300", effectively forming a buffer chamber. The area between the sealing plates 310B', 310A" is, therefore, protected, for example, from process gases, some of which may be corrosive. By isolating the area between the sealing plates from the interiors of the chambers, the drive mechanism 350 associated with the substrate transfer shuttle can be protected from contact with corrosive gases or other harmful materials used within the chambers during substrate processing. Additionally, the pressure of the area between the sealing plates 310B', 310A" can be controlled independently of the pressures in the interiors 348', 348" of either or both of the chambers 300', 300". For example, the pressure in the area between sealing plates 310B', 310A" can be controlled to increase the force applied by the sealing plates 310B', 310A" against the respective seats 314B', 314A" to improve the seal created by the plates. Similarly, prior to unsealing the plates 310B', 310A", the pressure in the area between the plates can be controlled to make it easier to unseal them from their respective seats 314B', 314A".

Other implementations are within the scope of the following claims.

What is claimed is:

1. An isolation valve comprising:
   a housing defining a channel between a first port and a second port;
   a gate disposed within the housing and displaceable between a stowed position which opens the channel and a deployed position which closes the channel, the gate including:
   (a) first and second sealing members; and
   (b) an expandable member disposed between the first sealing member and the second sealing member, wherein the expandable member is expandable from a first condition to a second condition and is contractable from the second condition to the first condition, wherein, in the first condition, the gate is moveable between the stowed and deployed positions, and in the second condition, with the gate in the deployed position, the first and second sealing members are biased apart from each other by expansion of the expandable member to close the channel;
   an actuator for selectively moving the gate between the stowed and deployed positions;
   a frame coupling the actuator to the gate, the frame including a transverse cross-member coupled to the actuator and having first and second ends and first and second post members at the first and second ends of the cross-member, respectively; and
   first and second flexures, each of which has an upper edge and a lower edge, the lower edges of the flexures secured to the cross-member, the upper edge of the first flexure secured to the first sealing member, and the upper edge of the second flexure secured to the second sealing member.

2. The valve of claim 1, further comprising a first conduit for inflating the expandable member, the first conduit passing between the first and second flexures.

3. The valve of claim 2, further comprising a second conduit for deflating the expandable member, wherein the second conduit passes between the first and second flexures.

4. The valve of claim 1, wherein, with the gate in the deployed position and the expandable member in the second condition, the second sealing member engages the second port.

5. The valve of claim 1, wherein the first and second sealing members are substantially aligned with and parallel to each other.

6. The valve of claim 1, wherein each of the first and second sealing members comprises a substantially flat plate.

7. The valve of claim 1, wherein the expandable member comprises an inflatable member, and the inflatable member is continuous and subsequently laterally coextensive with the sealing members.

8. The valve of claim 7, wherein the expandable member comprises an elastomeric bladder.

9. The valve of claim 1, wherein the expandable member comprises a bellows.

10. The valve of claim 1, wherein the first sealing member includes a first gasket, and the second sealing member includes a second gasket.

11. The valve of claim 1, wherein the housing further includes a bay, and the gate resides in the bay when the expandable member is in the first condition and the gate is in the stowed position.

12. The valve of claim 1, further comprising at least one spring biasing the first and second sealing members toward each other.

13. The valve of claim 12, comprising a plurality of pairs of tension springs, wherein a first spring in each pair couples the first sealing member to a frame, and a second spring in each pair couples the second sealing member to the frame, the first spring axially aligned with the second spring.

14. The valve of claim 1, wherein the housing further comprises a conduit coupled to a fluid source.

15. The valve of claim 14, wherein the housing is vented to ambient pressure.

16. The valve of claim 14, wherein, with the gate in the deployed position and the expandable member in the second position, the gate blocks fluid communication between the first and second ports and the channel.

17. The valve of claim 1, wherein the first and second posts comprise first and second centering blocks, respectively, and the centering blocks are disposed between the first and second sealing plates.

* * * * *

UNITED STATES PATENT AND TRADEMARK OFFICE
CERTIFICATE OF CORRECTION

PATENT NO. : 6,079,693
APPLICATION NO. : 09/082376
DATED : June 27, 2000
INVENTOR(S) : Gary C. Ettinger et al.

It is certified that error appears in the above-identified patent and that said Letters Patent is hereby corrected as shown below:

Column 1,
Lines 4-21, please substitute the following text:
--The present application is related to U.S. Patent No. 6,235,634, issued May 22, 2001, and entitled "Modular On-Line Processing System," as well as the following U.S. Patents: (1) "Method and Apparatus for Substrate Transfer and Processing," U.S. Patent No. 6,213,704, issued April 10, 2001; (2) "Multi-Function Chamber For Substrate Processing System," U.S. Patent No. 6,086,362, issued July 11, 2000; (3) "An Automated Substrate Processing System," U.S. Patent No. 6,215,897, issued April 10, 2001; (4) "substrate Transfer Shuttle Having a Magnetic Drive," U.S. Patent No. 6,206,176, issued March 27, 2001; (5) "Substrate Transfer Shuttle," U.S. Patent Application No. 09/082,484, filed May 20, 1998; (6) "In-Situ Substrate Transfer Shuttle," U.S. Patent No. 6,176,668, issued January 23, 2001; and (7) "Modular Substrate Processing System", U.S. Patent Application No. 08/946,922.--

Column 2,
Line 37, please change "dificult" to --difficult--.
Line 40, please change "ditcult" to --difficult--.
Line 61, please change "insuicient" to --insufficient--.

Column 7,
Line 66, please change "suecient" to --sufficient--.

Column 8,
Line 31, please change "flouroelastomer" to --fluoroelastomer--.

UNITED STATES PATENT AND TRADEMARK OFFICE
CERTIFICATE OF CORRECTION

PATENT NO.        : 6,079,693
APPLICATION NO.   : 09/082376
DATED             : June 27, 2000
INVENTOR(S)       : Gary C. Ettinger et al.

It is certified that error appears in the above-identified patent and that said Letters Patent is hereby corrected as shown below:

Column 13,
Line 30, please change "application" to --patent no. 6,213,704--.
Line 32-33, please change "[attorney docket 2519/US/AKT (05542/235001)]" to --issued Apr. 10, 2001--.

Signed and Sealed this

Twenty-seventh Day of November, 2007

JON W. DUDAS
*Director of the United States Patent and Trademark Office*